(12) United States Patent
Goetz et al.

(10) Patent No.: US 12,547,419 B2
(45) Date of Patent: Feb. 10, 2026

(54) CONFIGURATION FILE DATABASE FOR DISPENSING SYSTEMS

(71) Applicant: Delaware Capital Formation, Inc., Wilmington, DE (US)

(72) Inventors: John Matthew Goetz, Cincinnati, OH (US); Geoffrey Sallows, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 1102 days.

(21) Appl. No.: 17/604,850

(22) PCT Filed: May 5, 2020

(86) PCT No.: PCT/US2020/031437
§ 371 (c)(1),
(2) Date: Oct. 19, 2021

(87) PCT Pub. No.: WO2020/227268
PCT Pub. Date: Nov. 12, 2020

(65) Prior Publication Data
US 2022/0222087 A1 Jul. 14, 2022

Related U.S. Application Data

(60) Provisional application No. 62/843,777, filed on May 6, 2019.

(51) Int. Cl.
*G06F 9/445* (2018.01)
*D06F 31/00* (2006.01)
(Continued)

(52) U.S. Cl.
CPC .......... *G06F 9/44505* (2013.01); *D06F 31/00* (2013.01); *D06F 33/37* (2020.02);
(Continued)

(58) Field of Classification Search
CPC ...... G06F 9/44505; D06F 31/00; D06F 33/37; D06F 34/04; D06F 39/02; D06F 39/022;
(Continued)

(56) References Cited

U.S. PATENT DOCUMENTS 10,105,288 B1 * 10/2018 Nosrati ................. A61J 7/0069
10,449,310 B2 * 10/2019 Jackson ............. A61B 5/14532
(Continued)

FOREIGN PATENT DOCUMENTS

WO 9924093 A1 5/1999

OTHER PUBLICATIONS

European Patent Office, International Search Report and Written Opinion in PCT Application No. PCT/US2020/031437, Jul. 27, 2020.

(Continued)

*Primary Examiner* — Michael Collins
(74) *Attorney, Agent, or Firm* — Fish & Richardson P.C.

(57) ABSTRACT

Systems, methods, and computer program products for configuring and managing chemical dispensers (41). A mobile device (18) scans for and wirelessly connects to dispensers (41) within range of the wireless device (18). The wireless device (18) downloads one or more configuration files from a database (28) of dispenser configuration files for configuring the dispenser (41). In response to the user selecting a configuration file, one or more configuration parameters defined by the configuration file are uploaded into the dispenser (41). The wireless device (18) may then step the user through setup of the dispenser (41) using data in the configuration file. The mobile device (16) may further determine the location of the dispenser (41), and upload the location to the database (28). The database (28) may then associate the dispenser (41) with the location as well as keep track of how the dispenser is configured.

25 Claims, 29 Drawing Sheets

(51) Int. Cl.
    *D06F 33/37* (2020.01)
    *D06F 34/04* (2020.01)
    *D06F 39/02* (2006.01)
    *D06F 103/22* (2020.01)
    *D06F 105/42* (2020.01)
    *H04L 65/1033* (2022.01)
    *H04L 67/12* (2022.01)
    *H04L 67/565* (2022.01)
    *H04L 69/00* (2022.01)

(52) U.S. Cl.
    CPC ............... *D06F 34/04* (2020.02); *D06F 39/02* (2013.01); *D06F 39/022* (2013.01); *D06F 2103/22* (2020.02); *D06F 2105/42* (2020.02); *H04L 65/1033* (2013.01); *H04L 67/12* (2013.01); *H04L 67/565* (2022.05); *H04L 69/26* (2013.01)

(58) Field of Classification Search
    CPC ............. D06F 2103/22; D06F 2105/42; H04L 65/1033; H04L 67/12; H04L 67/565; H04L 69/26; G16H 40/60
    See application file for complete search history.

(56) References Cited

U.S. PATENT DOCUMENTS

| | | | |
|---|---|---|---|
| 2002/0169636 | A1 | 11/2002 | Eggers et al. |
| 2014/0228783 | A1* | 8/2014 | Kraft ...................... G07F 15/04 604/300 |
| 2016/0137483 | A1* | 5/2016 | Pfeiffer ................. A61B 5/1118 600/509 |
| 2016/0146659 | A1* | 5/2016 | Saltzgiver ............ B65D 51/245 73/304 C |
| 2016/0331308 | A1* | 11/2016 | Zhou .................... A61M 35/003 |
| 2017/0134887 | A1* | 5/2017 | Wegelin ................. G06Q 10/06 |
| 2019/0142689 | A1* | 5/2019 | Marty ................. A61H 15/0092 601/112 |
| 2019/0240430 | A1* | 8/2019 | Jackson ............ A61M 15/0065 |
| 2020/0001027 | A1* | 1/2020 | Jackson ............ A61M 15/0081 |
| 2023/0401921 | A1* | 12/2023 | Locke ................. B67D 1/0878 |

OTHER PUBLICATIONS

European Patent Office, Second Written Opinion in PCT Application No. PCT/US2020/031437, Mar. 31, 2021.

European Patent Office, International Preliminary Report on Patentability in PCT Application No. PCT/US2020/031437, Jun. 22, 2021.

* cited by examiner

REPORT

Floor 3 Storage Room

Report Type

☑ Chemical Use    ☐ Racks    ☐ Events
   332              333         334

Report Range

☑ 1 Week    ☐ 1 Month
   338         340

Pump 1: Detergent

| Days | 185oz/week |
|---|---|
| Monday, Aug 5 | 20oz |
| Tuesday, Aug 6 | 24oz |
| Wednesday, Aug 7 | 35oz |
| Thursday, Aug 8 | 22oz |
| Friday, Aug 9 | 28oz |
| Saturday, Aug 10 | 27oz |
| Sunday, Aug 11 | 29oz |

Pump 2: Rinse Aid

| Days | 92oz/week |
|---|---|
| Monday, Aug 5 | 12oz |
| Tuesday, Aug 6 | 10oz |
| Wednesday, Aug 7 | 18oz |
| Thursday, Aug 8 | 14oz |
| Friday, Aug 9 | 14oz |
| Saturday, Aug 10 | 12oz |
| Sunday, Aug 11 | 12oz |

FIG. 11

REPORT

Floor 3 Storage Room

Report Type

☐ Chemical Use   ☑ Racks   ☐ Events
   *332*            *333*       *334*

Report Range

☑ 1 Week   ☐ 1 Month
   *338*       *340*

Dispenser

| Days | 150 Racks/week |
|---|---|
| Monday, Aug 5 | 7 Racks |
| Tuesday, Aug 6 | 12 Racks |
| Wednesday, Aug 7 | 65 Racks |
| Thursday, Aug 8 | 13 Racks |
| Friday, Aug 9 | 15 Racks |
| Saturday, Aug 10 | 17 Racks |
| Sunday, Aug 11 | 21 Racks |

REPORT

Floor 3 Storage Room

Monday, Aug 5

| Alert Type | No. Of Racks |
| --- | --- |
| Detergent Low | 1 |
| Conductivity Probe Faulty | 0 |
| Low Tank Temp. | 0 |
| Low Rinse Temp. | 0 |
| Delime Tank Reminder | 1 |
| Change Water Tank | 1 |
| Out of Detergent | 0 |
| Out of Rinse Aid | 5 |
| Out of Sanitizer | 1 |
| Squeeze Tube Change | 1 |
| Pump Jam | 0 |

FIG. 14

CONFIGURATION FILE DATABASE FOR DISPENSING SYSTEMS

BACKGROUND

This invention generally relates to chemical dispensers and, in particular, to methods, systems, and computer program products for controlling chemical dispensers.

Industrial and commercial firms frequently require the use of chemical solutions. For example, commercial laundry and warewash machines require various chemical products, such as rinse aids, detergents, and sanitizers, be dispensed into the machines at various stages of each wash cycle in order to perform properly. The type, amount, and order in which chemical products are dispensed can vary from cycle to cycle (e.g., due to different types of items being washed), between different washing machines (e.g., tunnel verses batch washing machines), as well as by location (e.g., due to different health code requirements or quality of water). In addition, technicians may be required to install and service dispensers for multiple customers each having their own particular formulas for washing.

Due to the wide variety of dispenser types and applications, determining how to configure a dispenser can be a difficult and time consuming process. In addition, keeping track of what types of dispensers have been deployed, how they are configured, where they are located, and whether they need servicing can be a daunting task for customers or suppliers who own or operate a large number of dispensers. These problems can compound each other when a new formula or software update needs to be installed in an existing base of deployed dispensers.

Thus, there is a need for improved systems, methods, and computer program products for configuring chemical dispensers.

SUMMARY

Embodiments of the invention are directed to improved systems, methods, and computer program products for dispensing products, such as chemical solutions. These systems may be remotely or locally programmable using an application that runs on a mobile device, and scalable for use with small on the premises laundries with top-load washers, medium laundries with washer/extractor machines, and large industrial laundries that use tunnel washers. The dispensing systems may also be used with ware-wash machines, or any other machine or process that uses chemical solutions.

In an embodiment of the invention, a system for configuring a dispenser is provided. The system includes a database containing one or more configuration files each defining one or more parameter values that configure the dispenser, and a mobile device in communication with both the database and a dispenser controller. The mobile device is configured to download a configuration file from the database, and upload the one or more parameter values defined by the configuration file to the dispenser controller. The one or more parameter values may then cause the dispenser to operate in accordance with the configuration file.

In an aspect of the invention, the mobile device may be further configured to scan for dispensers within range, wirelessly connect to one or more of the dispensers within range and, in response to connecting to a dispenser, download data from the dispenser.

In another aspect of the invention, the mobile device may be further configured to determine a location of at least one of the one or more of the dispensers within range of the mobile device, and upload the location to the database.

In another aspect of the invention, the data downloaded from the dispenser includes configuration data, and the mobile device may be further configured to display one or more dispenser windows each associated with one of the dispensers within range of the mobile device, and in response to activation of a dispenser window, display a manager screen that includes the configuration data for the dispenser associated with the activated dispenser window.

In another aspect of the invention, the manager screen includes one or more pump buttons, the data downloaded from the dispenser includes pump status data, and the mobile device may be further configured to, in response to activation of a pump button, display a status of the pump.

In another aspect of the invention, each of the dispenser windows includes a dispenser status bar that indicates a status of the dispenser.

In another aspect of the invention, each of the dispenser windows includes a status indicator that indicates if the dispenser is in an alarm condition.

In another aspect of the invention, the mobile device may be further configured to determine if each of the dispensers within range of the mobile device meets a filter criterion, and only display dispenser windows for the dispensers that meet the filter criterion.

In another aspect of the invention, the mobile device may be further configured to display a setup from file button and, in response to activation of the setup from file button, display one or more configuration buttons each associated with a respective configuration file in the database, wherein the configuration file is downloaded in response to activation of a configuration button associated with the configuration file.

In another aspect of the invention, the mobile device may be further configured to, in response to activation of the configuration button associated with the configuration file, display a configuration screen that includes one or more configuration parameter data entry fields each associated with a configuration parameter.

In another aspect of the invention, at least one of the one or more configuration parameter data entry fields is prepopulated with a parameter value defined by the configuration file.

In another aspect of the invention, the mobile device may be further configured to display a guided setup button that initiates a setup process and, in response to activation of the guided setup button, display a sequence of windows that prompt a user to enter configuration parameters.

In another aspect of the invention, the dispenser detects if a probe is connected to the dispenser, and if so, a type of the probe connected to the dispenser, and the mobile device is configured to display a probe status indicator that provides an indication of whether the probe is connected to the dispenser, and if so, the type of probe.

In another embodiment of the invention, a method for configuring the dispenser is provided. The method includes downloading the configuration file to the mobile device from the database containing the one or more configuration files each defining the one or more parameter values that configure the dispenser, and uploading the one or more parameter values defined by the configuration file from the mobile device to the dispenser controller, wherein the one or more parameter values cause the dispenser to operate in accordance with the configuration file.

In an aspect of the invention, the method may further include scanning for dispensers within range of the mobile device, wirelessly connecting the mobile device to one or more of the dispensers within range of the mobile device, and in response to the mobile device connecting to the dispenser, downloading data from the dispenser into the mobile device.

In another aspect of the invention, the method may further include determining the location of at least one of the one or more of the dispensers within range of the mobile device, and uploading the location from the mobile device to the database.

In another aspect of the invention wherein the data downloaded from the dispenser includes configuration data, the method may further include displaying one or more dispenser windows each associated with one of the dispensers within range of the mobile device, and in response to activation of the dispenser window, displaying the manager screen that includes the configuration data for the dispenser associated with the activated dispenser window.

In another aspect of the invention wherein the manager screen includes one or more pump buttons and the data downloaded from the dispenser includes pump status data, the method may further include, in response to activation of the pump button, displaying the status of the pump on the mobile device.

In another aspect of the invention, each of the dispenser windows includes the dispenser status bar that indicates the status of the dispenser.

In another aspect of the invention, each of the dispenser windows includes the status indicator that indicates if the dispenser is in the alarm condition.

In another aspect of the invention, the method may further include determining if each of the dispensers within range of the mobile device meets the filter criterion, and only displaying dispenser windows for the dispensers that meet the filter criterion.

In another aspect of the invention, the method may further include displaying the setup from file button on the mobile device, and in response to activation of the setup from file button, displaying one or more configuration buttons each associated with the respective configuration file in the database on the mobile device, wherein the configuration file is downloaded in response to activation of the configuration button associated with the configuration file.

In another aspect of the invention, the method may further include, in response to activation of the configuration button associated with the configuration file, displaying the configuration screen that includes one or more configuration parameter data entry fields each associated with the configuration parameter.

In another aspect of the invention, at least one of the one or more configuration parameter data entry fields may be prepopulated with the parameter value defined by the configuration file.

In another aspect of the invention, the method may further include displaying the guided setup button that initiates the setup process, and in response to activation of the guided setup button, displaying the sequence of windows that prompt the user to enter configuration parameters into the mobile device.

In another aspect of the invention, the method may further include detecting if the probe is connected to the dispenser, and if so, the type of the probe connected to the dispenser, and displaying the probe status indicator that provides the indication of whether the probe is connected to the dispenser, and if so, the type of probe.

In another embodiment of the invention, a computer program product for configuring the dispenser is provided.

The computer program product includes a non-transitory computer-readable storage medium, and program code stored on the non-transitory computer-readable storage medium. The program code is configured so that, when executed by one or more processors, the program code causes the one or more processors to download the configuration file to the mobile device from the database containing one or more configuration files each defining one or more parameter values that configure the dispenser, and upload the one or more parameter values defined by the configuration file from the mobile device to the dispenser controller, wherein the one or more parameter values cause the dispenser to operate in accordance with the configuration file.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIGS. 8-28 are diagrammatic views of screens that may be displayed by the mobile device of FIG. 1 while running the application for managing dispensers in accordance with another embodiment of the invention.

It should be understood that the appended drawings are not necessarily to scale, and may present a somewhat simplified representation of various features illustrative of the basic principles of the invention. The specific design features of the sequence of operations disclosed herein, including, for example, specific dimensions, orientations, locations, and shapes of various illustrated components, may be determined in part by the particular intended application and use environment. Certain features of the illustrated embodiments may have been enlarged or distorted relative to others to facilitate visualization and a clear understanding.

DETAILED DESCRIPTION

Figure 1:
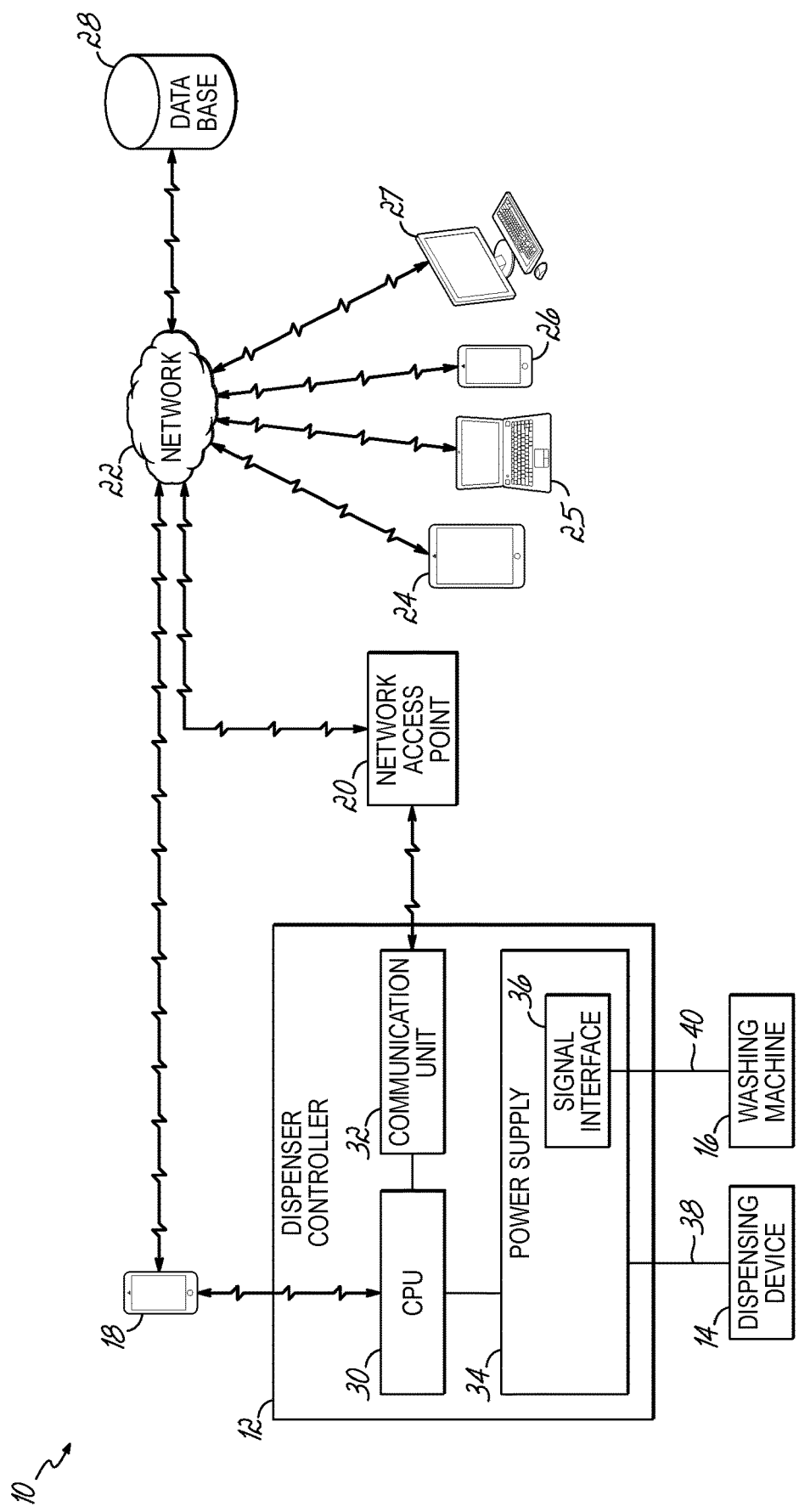
FIG. 1 is a diagrammatic view of an operating environment including a mobile device and a dispenser.

FIG. 1 depicts an exemplary operating environment 10 including a dispenser controller 12, a dispensing device 14, a washing machine 16 (e.g., a ware-washing machine, a clothes-washing machine, or any other machine or process that uses chemical solutions), a mobile device 18, a network access point 20, and a network 22 in communication with one or more computers 24-27, such as a tablet computer 24, a laptop computer 25, a mobile device 26, or a desktop computer 27, and a database 28. The computers 24-27 may enable users to access data generated by the dispenser controller 12, dispensing device 14, or washing machine 16, either directly or from the database 28. The computers 24-27 may also enable users to update the configuration of the dispenser controller 12, dispensing device 14, or washing machine 16, e.g., by downloading dispensing programs to the dispenser controller 12. One or more of the computers 24-27 may include a server (e.g., a webserver, an application server, or a database server) that communicates with a client application on the mobile device 18, such as a web browser or other mobile application. In an embodiment of the invention, the dispenser controller 12 and dispensing device 14 may be integrated into a single dispenser.

The dispenser controller 12 may include a central processing unit 30, a communication unit 32, and a power supply 34. The central processing unit 30 may include a microprocessor and a user interface. In an embodiment of the invention, the user interface may include one or more buttons (e.g., four buttons) and one or more lights (e.g., four lights). The communication unit 32 may be an optionally installed board that includes a transceiver configured to enable the central processing unit 30 to communicate with the network 22, e.g. using the access point 20. The transceiver may include a microprocessor, a radio frequency transmitter, and a radio frequency receiver. The radio frequency transmitter and receiver may communicate using one or more sub-Gigahertz carrier frequencies, such as those found in the industrial, scientific and medical (ISM) radio band. The communication unit 32 may also be configured to communicate over a transmission line, such as a cable including conductive elements or an optical fiber, using a suitable communication protocol, such as Ethernet. The communication unit 32 may enable the dispenser controller 12 to transmit usage and error information in real-time to the network 22, and may transmit warning or error messages (e.g., via email or text message) to authorized users. The communication unit 32 may also enable users with sufficient security clearance to remotely access and adjust settings of the dispenser controller 12 and review reports via an Internet connection.

The dispensing device 14 may be configured to provide one or more chemical products from one or more sources of chemical product (i.e., a container of the chemical product) to the washing machine 16. The chemical products may be provided in the form of a dilute chemical solution that is created by mixing the chemical product with a diluent (e.g., water), or by dispensing the chemical product directly from the source into the washing machine 16. To this end, the dispensing device 14 may be connected to a source of diluent, and may include one or more pumps, venturi-based eductors, flush manifolds, valves, etc. configured to deliver controlled amounts of chemical product to the washing machine 16 in response to signals from the dispenser controller 12. The dispenser controller 12 may be remote from the dispensing device 14 or integrated into the dispensing device 14, and may control a single dispensing device 14, or multiple dispensing devices 14. As used herein, the term "dispenser" may refer to the dispensing device 14 alone or in combination with the dispenser controller 12.

The power supply 34 may receive power from the electric grid (e.g., 240 to 90-volt AC power) and provide one or more DC or AC voltages used by the dispensing device 14, washing machine 16, central processing unit 30, and communication unit 32 (e.g., 24-volt DC power). Power may be provided to the dispensing device 14, for example, through a multi-conductor cable 38 (e.g., a seven-conductor cable) that carries power and data signals, and that operably couples the dispensing device 14 to the power supply 34. An additional cable 40 may connect the power supply 34 to the washing machine 16.

The power supply 34 may include a signal interface 36 configured to transmit signals to and receive signals from the washing machine 16 and central processing unit 30. In an alternative embodiment of the invention, the signal interface 36 may be separate from the power supply. The signal interface 36 may include a microcontroller or other control logic, a machine interface that operably couples the microcontroller to the washing machine 16, and a CPU interface that operably couples the microcontroller to the central processing unit 30. The signal interface 36 may enable communication between the washing machine 16 and central processing unit 30 by translating communication protocols and signals used by the washing machine 16 and central processing unit 30. The signal interface 36 may also operably couple the central processing unit 30 to one or more sensors, such as a conductivity probe that senses a conductivity of a washing solution in the washing machine 16, a float probe that senses a level of solution in the washing machine 16, a temperature probe that senses a temperature of the solution in the washing machine 16, or any other suitable sensor. The conductivity probe may be an inductive probe that determines a chemical concentration level using a magnetic field generated by one or more coils. The conductivity probe may also measure conductivity between electrodes in direct contact with the washing solution.

For example, the signal interface 36 may include a trigger signal interface that receives trigger signals from the washing machine 16 indicative of an operational state of the washing machine 16, e.g., the beginning or end of a fill cycle, wash cycle, rinse cycle, etc. The signal interface 36 may convert the trigger signals (e.g., 24-volt AC signals) into signals having a voltage level suitable for use by the central processing unit 30 (e.g., 5-volt logic-level signals). To this end, the signal interface 36 may include optical isolators or other devices that provide galvanic isolation between high voltage trigger signals received from the washing machine 16 and the other system components.

The mobile device 18 may be a smart phone, tablet computer, or any other portable computing device, and may communicate with the central processing unit 30 using a suitable communication protocol, e.g., a communication protocol having a relatively short range such as between one and 20 meters. Exemplary communication protocols may include, but are not limited to, Bluetooth®, Radio Frequency Identification (RFID), and Near-Field Communication (NFC). The mobile device 18 may also communicate with the network 22 using a communication protocol such as Wi-Fi®, Bluetooth®, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Integrated Digital Enhanced Network (iDEN), or any other suitable protocol. The mobile device 18 may also retrieve data regarding the dispenser by scanning a Quick Response (QR) code, NFC device, or the like. The retrieved data may be used, for example, to track and manage assets.

A mobile application may reside on the mobile device 18 that is used to wirelessly connect to any dispenser controller 12 within range. In response to connecting to the dispenser controller 12, the mobile application may indicate a condition of one or more dispensing devices 14 in communication with the dispenser controller 12. Exemplary conditions may include whether the dispensing device 14 is operating normally or is in an alarm condition. The mobile application may also display settings, usage and error history, a maintenance schedule, etc. for each dispensing device 14 to which the dispenser controller 12 is connected.

The mobile application may enable a user (e.g., a technician performing maintenance on an existing system or installing a new system) to configure the dispenser controller 12 or a dispensing device 14 associated therewith. The mobile application may also include "plug-and-play" features that enable it to be customized to a particular system configuration, such as the number and type of pumps, probes (e.g., conductivity or float probe), etc. The mobile application may also enable the user to download usage and error reports and view these reports in a user friendly, customized format.

The dispenser controller 12 may be configured to recognize one or more of the make, model, and serial number of the dispenser device 14 to which it is connected. This determination may be made, for example, based on signals received through the cable 38. Suitable signals for identifying the dispensing device 14 may include serial data signals, impedance signals (e.g., sensing the presence of absence of one or more jumpers), or any other electrical signal that can be used to convey information. The dispenser controller 12 may provide this data to the mobile application on mobile device 18 in response to a query. Advantageously, this feature may enable the mobile application to automatically configure the user interface based on the type and configuration of dispensing device 14 being controlled. For example, the mobile application may present different user interface elements depending on whether the dispensing device 14 dispenses solid or liquid chemical products, the type and number of sensors used (e.g., inductive, capacitive, or contact based concentration probes, temperature sensors, level sensors, etc.), the type of pump, and whether the pump is activated by a motor or solenoid.

The mobile application may upload dispenser settings, usage, and error data to the network 22 via the network connectivity of the mobile device 18. The mobile application may also enable users to adjust settings, share settings and other reports using communication applications (e.g., e-mail or instant messaging) to facilitate remote support. The mobile application may also be configured to provide access to help videos, instruction sheets, troubleshooting documents, spares, contacts, etc.

The network access point 20 may include hardware and software that enables devices such as the dispenser controller 12 or mobile device 18 to communicate with the network 22. To this end, the network access point 20 may include one or more transceivers that transmits and receives data using a suitable protocol, such as Wi-Fi or Ethernet. The network access point 20 may also include data processing circuitry that maps data between one or more layers of the communication protocols used by the devices 12, 18 (e.g., Wi-Fi) and the network 22 (e.g., Ethernet). The network access point 20 may provide a central hub that enables multiple dispenser controllers 12 or dispensing devices 14, including different types of dispensing controllers 12 and dispensing devices 14, to communicate with each other or one or more of the computers 24-27. Communication between the dispenser controller 12 and network access point 20 may use a communication protocol that enables communication over a relatively long distance (e.g., between 100 and 1000 meters) such as Wi-Fi or WiMAX. In an embodiment of the invention, the access point 20 may include a cellular modem that connects to a cellular network for communication with the computers 24-27 or database 28.

Data provided to the dispenser controller 12 by the dispensing device 14 may include flow data for one or more of dispensed chemical products, diluent, or solution. Flow data may be generated by one or more flow switches or flow meters, or may be generated based on pump displacement and motor speed. When available, data from flow switches or flow meters may be used to adjust the pump running time or speed and to meter the desired flow. Data may also be provided to the dispenser controller 12 by the washing machine 16, or may be inferred by the dispenser controller 12 based on trigger signals received from the washing machine 16. This data may include a number of wash cycles, wash loads, etc.

Figure 2:
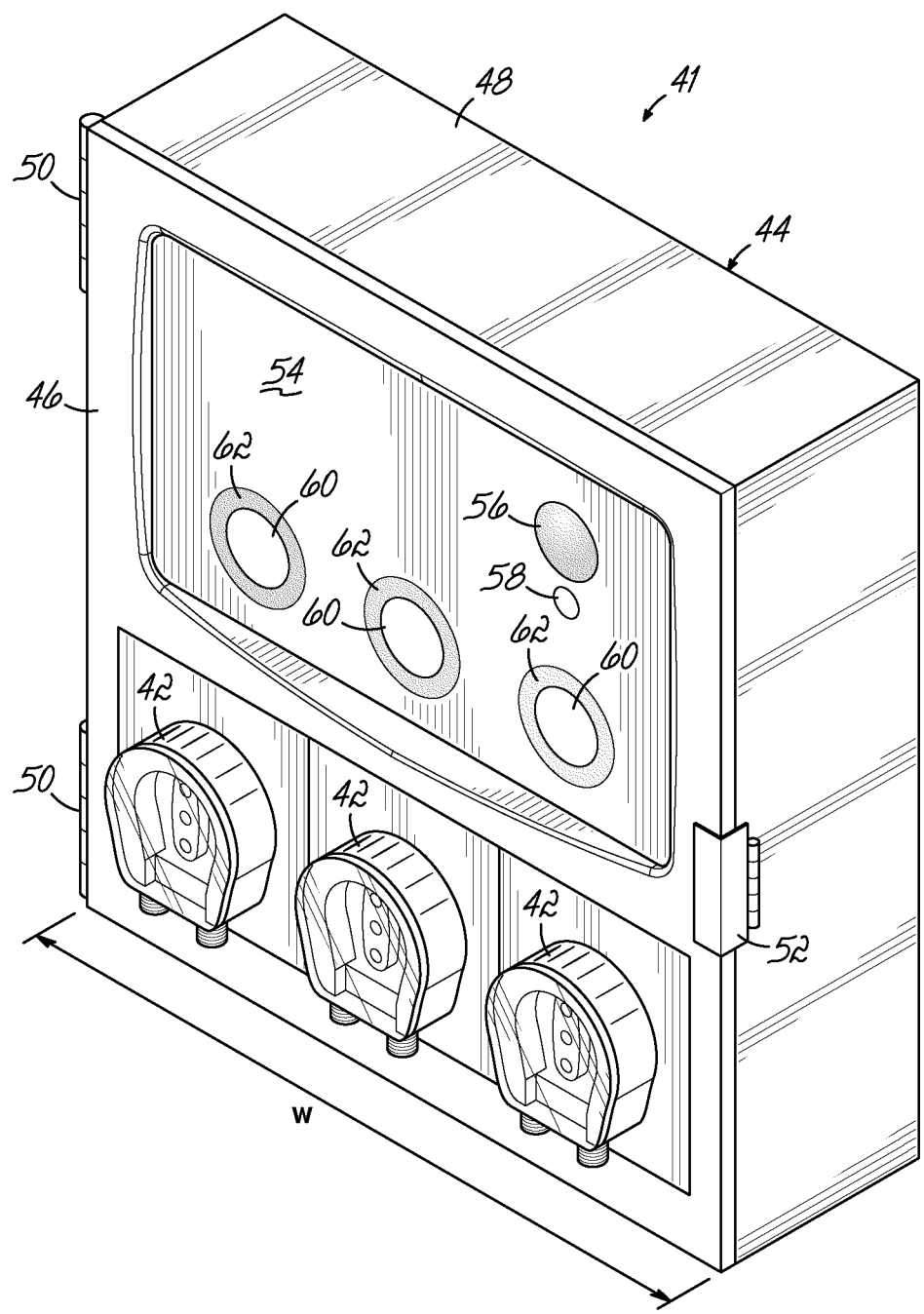
FIG. 2 is a diagrammatic view of an embodiment of the dispenser of FIG. 1.

FIG. 2 depicts an exemplary dispenser 41 (e.g., an integrated dispenser controller 12 and dispensing device 14) that includes one or more pumps 42 (e.g., three pumps), and a housing 44. The pumps 42 may be peristaltic pumps (shown), diaphragm pumps, or any other suitable type of pump. The housing 44 may include a door 46 coupled to a frame 48 by one or more hinges 50. A latch 52 may secure the door 46 to the frame 48 when the door 46 is in a closed position. The housing 44 may have a width w that varies depending on the number of pumps 42 provided by the dispenser 41.

The dispenser 41 may include an overlay 54, a standby button 56, a dispenser status indicator 58 (e.g., a light emitting diode (LED)), and one or more prime buttons 60 (e.g., one for each pump 42). Each of the prime buttons 60 may be associated with a respective pump status indicator 62. One or more of the overlay 54, standby button 56, dispenser status indicator 58, prime buttons 60, and pump status indicators 62 may be mounted to or visible through the door 46 so that they are readily accessible when the door 46 is in the closed position. For example, the door 46 may be transparent or include a transparent portion that enables users to view the pumps 42 or indicators 58, 62 while the door 46 is in the closed position.

The dispenser 41 may be configured so that in response to pushing and holding the standby button 56 for a predetermined period of time (e.g., 1 second), the dispenser 41 cycles between an on-state and an off- or standby-state. This feature may be user settable, e.g., the predetermined period of time may be set, or the feature disabled, using the mobile application. The standby button 56 may be located on the right side of the door 46 (as shown), or in any other suitable location, such as the center or left side of the door 46, and the position may vary depending on the number of pumps 42.

The status indicator 58 may include one or more light sources (e.g., a blue LED, a green LED, and a red LED) that indicate the status of the dispenser 41. For example, the status indicator 58 may emit light having different colors or intensities depending on the status of the dispenser 41. For example, the status indicator may emit a green light when the dispenser 41 is in the on-state but not connected to the mobile device 18 or access point 20, and may emit a blue light in response to being connected to the mobile device 18 or access point 20. The intensity of the light may be constant or may vary over time, e.g., by slowly fading in and out in the manner of a heart-beat.

Each of the one or more prime buttons 60 may be associated with a respective pump 42 and a respective pump status indicator 62. In response to pressing a prime button 60, the respective pump 42 may execute a priming function that introduces a chemical product into the pump 42 to prepare the pump 42 for operation. The prime buttons 60 may be disabled using the mobile application, either collectively or individually. When a prime button 60 has been disabled, activation of the prime button 60 will not cause the associated pump 42 to execute the priming function.

Each of the pump status indicators 62 may be proximate to its respective prime button 60 (e.g., an LED proximate to, or a ring surrounding, the button), and may emit light of varying color or intensity to indicate a status of the associated pump 42. To this end, each pump status indicator 62 may include one or more light sources (e.g., LED's having different colors) and an optical element (e.g., a light-pipe) that directs the light toward an observer. By way of example, an indicator 62 may emit a green light when its respective pump 42 is running normally, an orange or yellow light when the pump 42 requires non-urgent attention, and a red light when the pump 42 requires urgent attention. In the event urgent attention is needed, the pump 42 in question may be stopped and an alarm activated, e.g., by sounding a buzzer. In an alternative embodiment of the invention, each pump status indicator 62 may be configured to illuminate a chamber of the housing 44 containing the pump 42 rather than emitting light from a position on the door 46 as shown.

Conditions requiring urgent attention may include the occurrence of a pump jam or an out of product condition. An out of product condition may be determined, for example, based on a concentration probe reading at the washing machine 16 or a float or other level probe reading at the source of the chemical product. Conditions requiring non-urgent attention may include a pump tube that needs changing, tank water that needs changing, de-lime required, or an unconfigured dispenser. Each of these non-urgent conditions may be associated with a different display by the pump status indicator 62, such as a flashing light (e.g., on two seconds for each six second period), a continuous light output, synchronous flashing of multiple status indicators at one rate (e.g., on one second for each three second period), or synchronous flashing of multiple status indicators at another rate (e.g., on one second for each two second period), respectively.

The dispenser 41 may include a device that emits an audible sound, e.g., a buzzer. In an embodiment of the invention, the priming function of the prime buttons 60 may be disabled when the buzzer is sounding. This may enable the prime buttons 60 to be used to put the dispenser 41 into a "snooze mode" by pressing any one of the prime buttons 60 without activating an unwanted pump priming. The snooze mode may silence the buzzer for a predetermined amount of time, such as until the event which triggered the buzzer has been cleared. When the dispenser 41 is in the snooze mode, the pump status indicator 62 associated with the prime button 60 used to enter the snooze mode may change its appearance, e.g., change from a solid light to a flashing light. The priming function for this prime button 60 may then continue to be suppressed so that the button can be used to control the dispenser 41. For example, pressing and holding the prime button 60 in question for a predetermined period of time (e.g., three seconds) may cause the fault which triggered the alarm to be reset.

Figure 3:
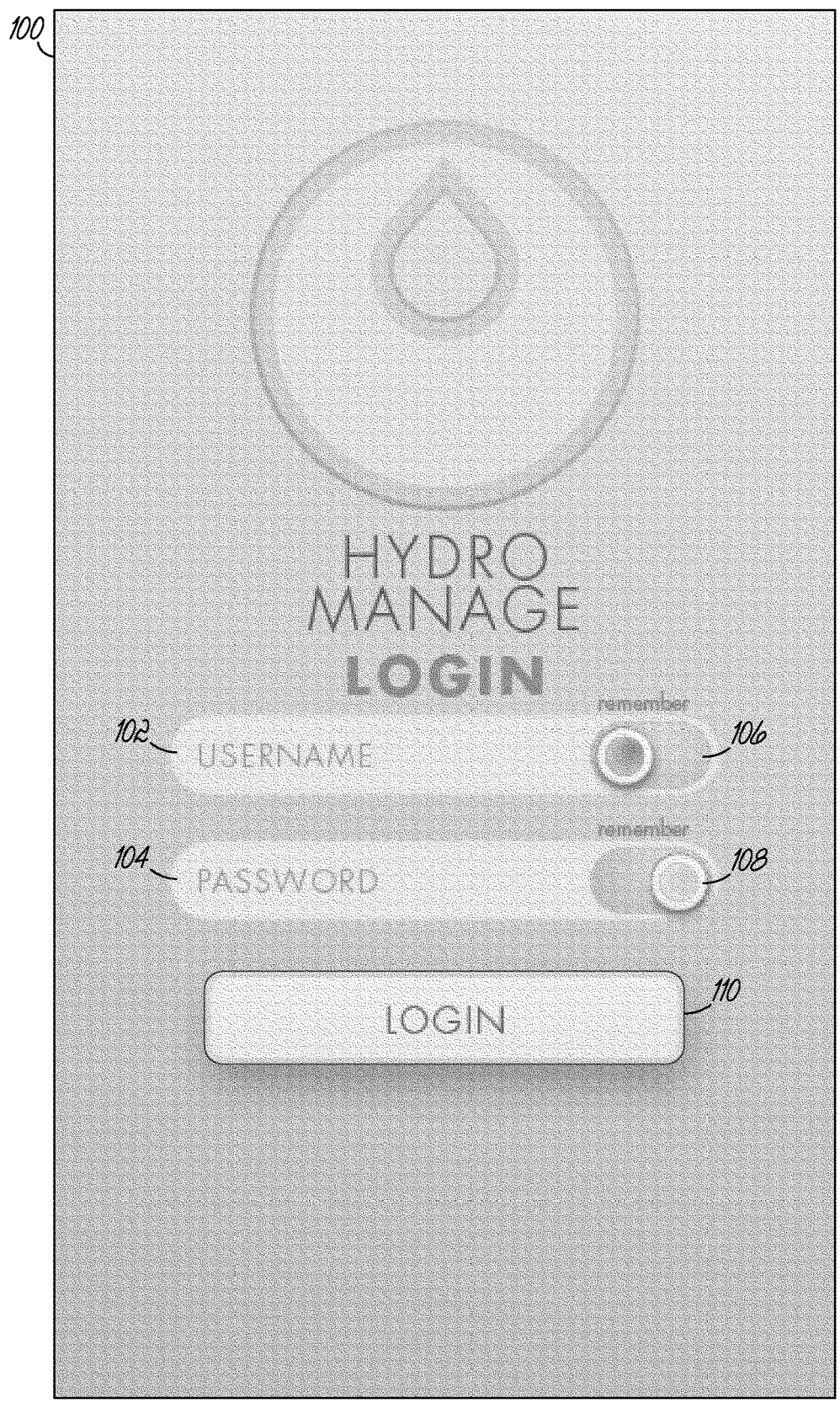
FIGS. 3-7 are diagrammatic views of screens that may be displayed by the mobile device of FIG. 1 while running an application for managing dispensers in accordance with an embodiment of the invention.

FIGS. 3-7 depict exemplary screens of a user interface (e.g., a graphical user interface (GUI)) that may be displayed by the mobile application running on the mobile device 18. FIG. 3 depicts an exemplary login screen 100 that includes a username data entry field 102, a password data entry field 104, and slider buttons 106, 108 that allow the user to select whether the mobile application remembers the data that has been entered into the respective data entry fields 102, 104.

Once the user has entered their username and password into the data entry fields 102, 104 and selected a memory option using the slider buttons 106, 108, the user may activate a login button 110. Activating the login button 110 may cause the mobile application to attempt to authenticate the user based on the data entered into the data entry fields 102, 104, either by the user or from the memory of the mobile device 18. The authentication process may include comparing the entered data to a list of valid users in the database 28. If the username and password cannot be authenticated by the mobile application, the mobile application may redisplay the login screen 100 with an indication that the entered information could not be authenticated.

Figure 4:
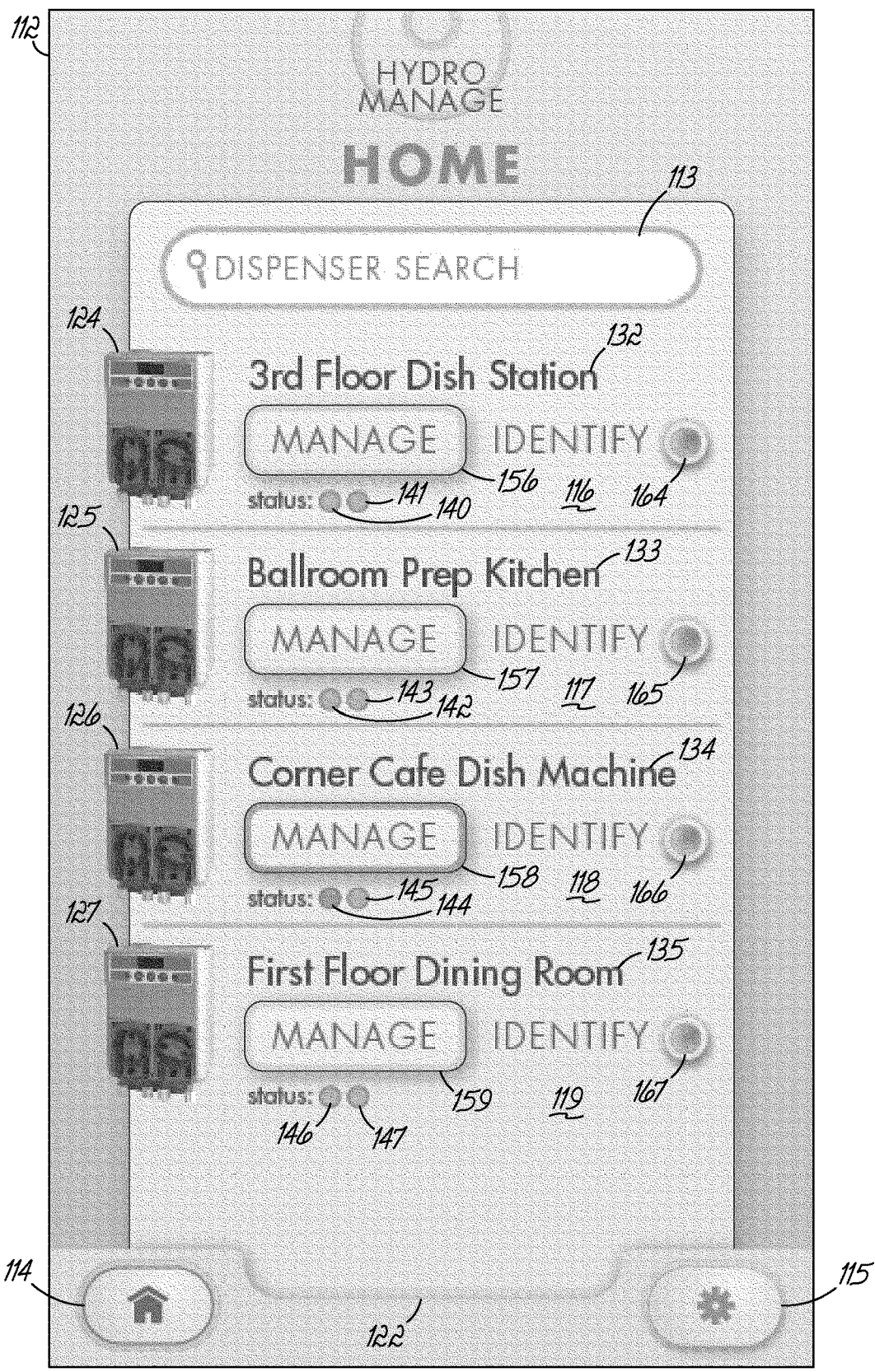

Referring now to FIG. 4, in response to the mobile device 18 connecting to a dispenser controller 12 or the database 28, and the username and password being authenticated, the mobile application may display a home screen 112. The home screen 112 may indicate a condition of one or more dispensers, e.g., whether the dispenser is operating normally, in standby-mode, or in an alarm condition. The home screen 112 may also include a data entry field 113 for entering search terms (e.g., a dispenser location, type, user, etc.), a home button 114, a settings button 115, one or more data display windows 116-119 that provide information relating to the one or more dispensers, and an information tab 122. The information displayed in the data display windows 116-119 may include, for example, search results for a term entered into the data entry field 113. Each data display window 116-119 may include an icon 124-127 that indicates a type of dispenser, a character string 132-135 that identifies a particular dispenser (e.g., by location), and one or more status indicators 140-147.

Each status indicator 140-147 may provide an indication of a status of the dispenser, such as the status of a pump of the dispenser. The status may be indicated, for example, by outputting a predetermined color corresponding to the status in question. For example, green may indicate normal operation, yellow or orange may indicate a non-urgent condition, and red may indicate an urgent condition. Each data display window 116-119 may also include a manage button 156-159 and an identify button 164-167. When one or more of the status indicators 140-147 of a dispenser indicates a problem with the dispenser, the manage button 156-159 of that window 116-119 may change color or otherwise provide an indication that the respective dispenser has an issue which the user may want to investigate.

Figure 5:
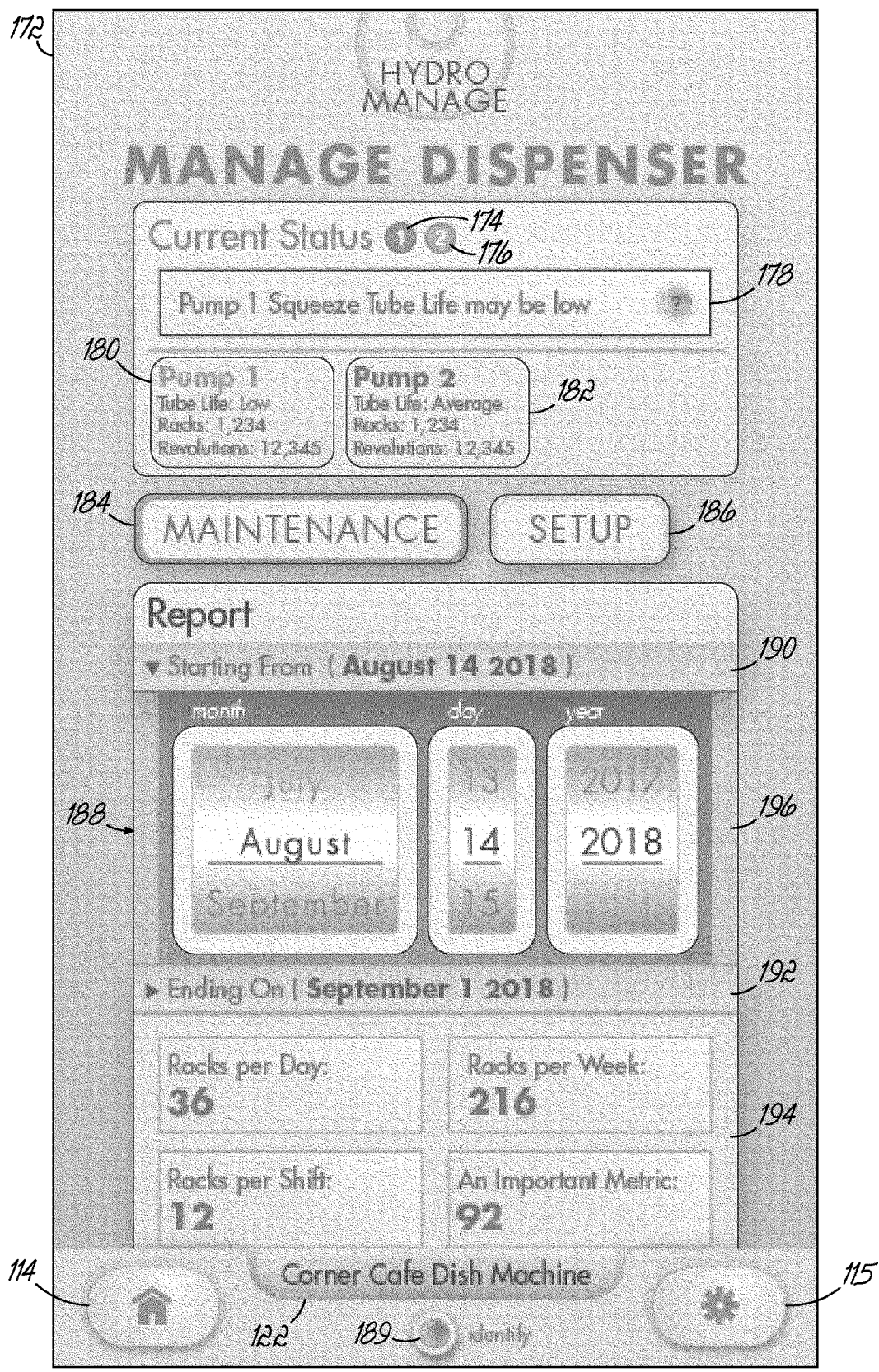

Referring now to FIG. 5, activating a manage button 156-159 may bring up a manager screen 172 for the dispenser associated with the data display window 116-119 of the activated manage button 156-159. Activating the manage button 156-159 may also cause the information tab 122 to display an identity of the dispenser or associated washing machine. The manager screen 172 may include status indicators 174, 176, a status message window 178, one or more pump buttons 180, 182, one or more maintenance buttons 184, a setup button 186 that opens a setup screen, a report window 188, and an identify button 189.

The status message window 178 may display information that identifies an issue with one or more pumps of the dispenser in question. For example, the information may identify a pending maintenance issue, e.g., a squeeze tube that is nearing the end of its operational life. Each pump button 180, 182 may provide information about one of the pumps of the dispenser, such as the remaining service life of a component of the pump, a number of racks processed by the washing machine, or that the chemical product provided by the pump is running low or has been depleted.

The maintenance button 184 may be configured to open a maintenance window when activated, and the appearance of the maintenance button 184 may vary depending on a condition of the dispenser or equipment associated with the dispenser, such as the dispenser controller or washing machine. For example, in the absence of any maintenance issues, the maintenance button may have a neutral color, e.g., gray. In response to detection of a non-urgent condition, the appearance of the maintenance button 184 may indicate the non-urgent condition, e.g., by displaying a yellow or orange outline. In response to an urgent condition, the appearance of the maintenance button 184 may indicate the urgent condition, e.g., by displaying a red outline.

The report window 188 may include one or more drop-down windows 190, 192 that enable the user to select a start date and a stop date, or a predetermined range (e.g., the last week, last month or last 6 months) for aggregating data, and a results window 194. Activating a drop-down window 190, 192 may cause the mobile device 18 to display a spin box 196 for selecting the respective start or stop date. The results window 194 may display aggregated data generated during the period of time defined by the selected start and stop dates. Exemplary data may include racks processed by the washing machine, the volume of chemical used, or the number of alarm conditions detected per shift, per day, or per week, or any other metric related to operation of the dispenser or washing machine. Activating the identify button 189 may cause the manager screen 172 to populate the information tab 122 with information identifying the source of the data displayed in the report window 188, e.g., the identity of the washing machine.

Figure 6:
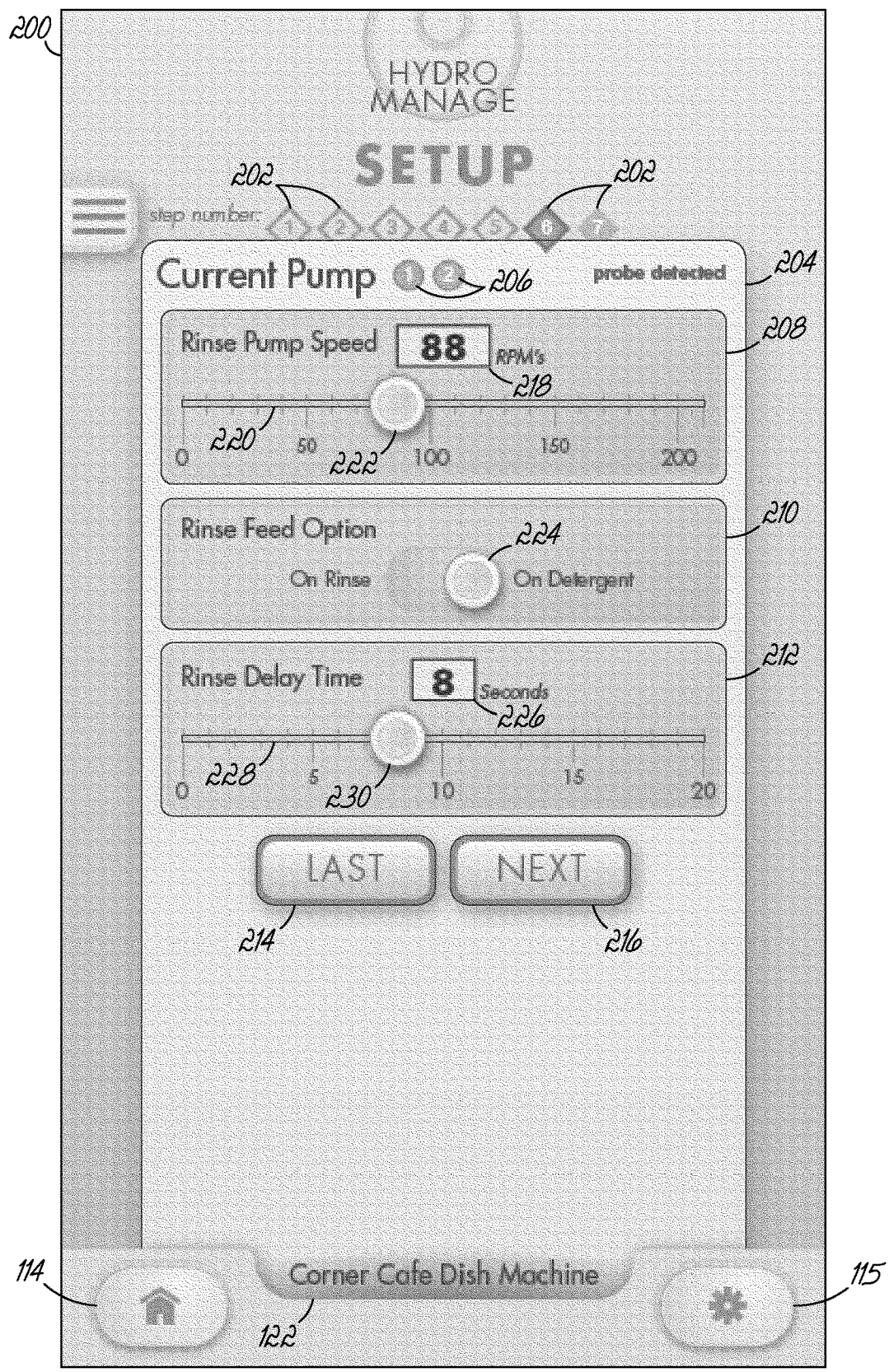

Referring now to FIG. 6, in response to activating the setup button 186, the mobile application may cause the mobile device 18 to display a setup screen 200. The setup screen 200 may include one or more step number buttons 202. Activating a step number button may cause the setup screen 200 to display an associated setup window, such as exemplary setup window 204. The step number buttons 202 may be arranged in a recommended order for configuring a new dispenser installation or reconfiguring an existing dispenser. The setup window 204 may include pump selection buttons 206, a pump setting window 208, a rinse feed option window 210, a rinse delay window 212, a last button 214, and a next button 216.

The pump setting window 208 may enable the user to control operation of the pump selected using the pump selection buttons 206. To this end, the pump setting window 208 may include a display box 218 and a track bar 220 having an indicator 222. The user may adjust the speed of the pump by moving the indicator 222 of track bar 220 horizontally until the display box 218 displays the desired pump speed. The user may also enter data setting the speed of the pump into a data entry field (not shown).

The rinse feed option window 210 may include a slider button 224 that enables the user to select between providing a rinse feed on a rinse cycle, or on a detergent dispensing cycle.

The rinse delay window 212 may enable the user to control a rinse delay time. To this end, the rinse delay window 212 may include a display box 226 and a track bar 228 having an indicator 230. The user may adjust the rinse delay time by moving the indicator 230 of track bar 228 horizontally until the display box 226 displays the desired rinse delay time. The user may also enter data setting the rinse delay time into a data entry field (not shown).

Activating the last button 214 may cause the setup screen 200 to display the setup window for the previous setup step. Activating the next button 216 may cause the setup screen 200 to display the next setup step. The last button 214 and next button 216 may thereby provide a way for the user to navigate between steps in addition to activating the step number buttons 202.

Figure 7:
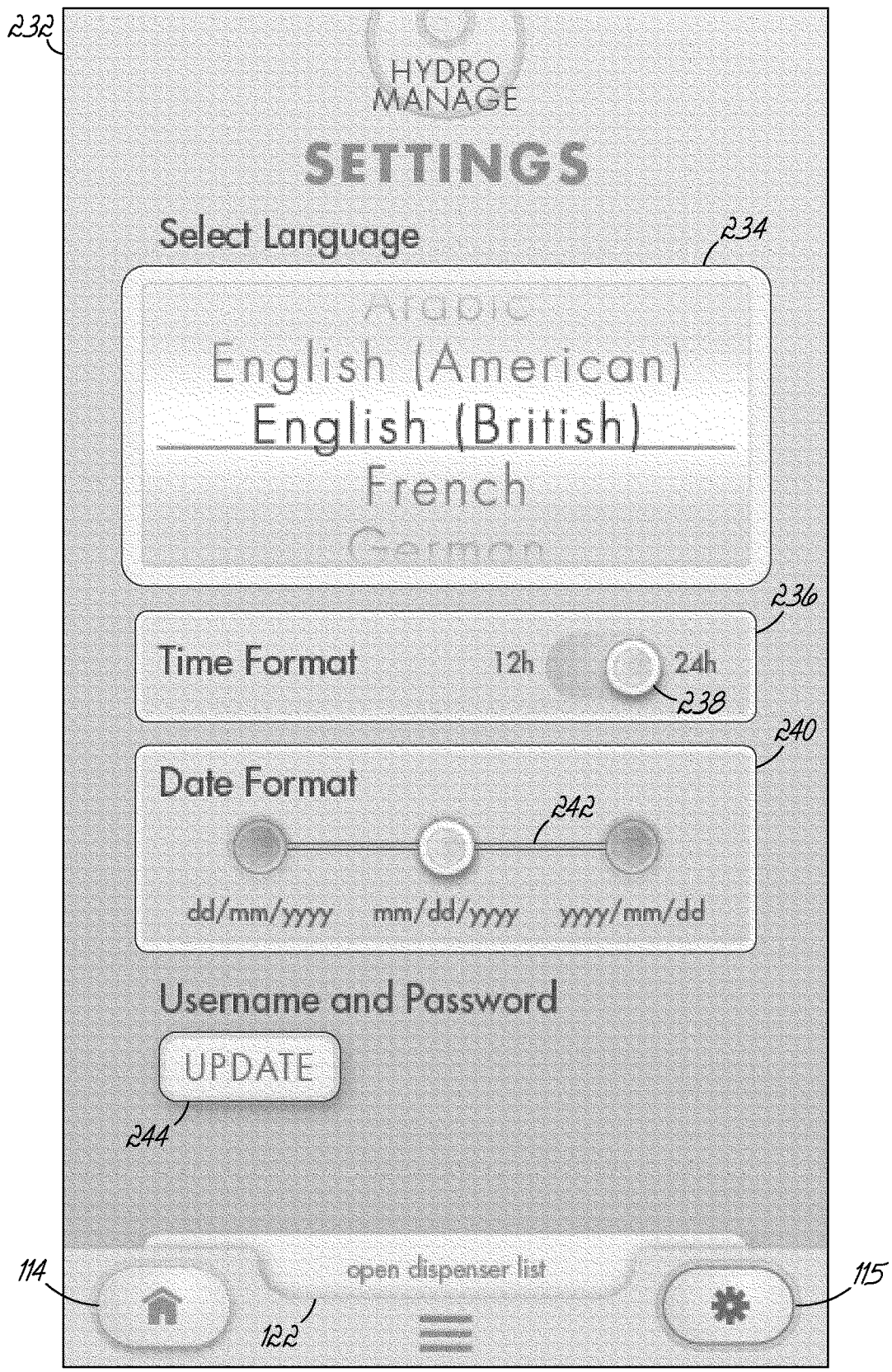

Referring now to FIG. 7, in response to activation of the settings button 115, the mobile application may cause the mobile device 18 to display a settings screen 232. The settings screen 232 may include a spin box 234 that enables users to select the language (shown), currency, units of measurement (e.g., metric or U.S.), or other settings used by the mobile application, a time format window 236 having a slider button 238 for selecting a time format (e.g., 12 hour, 24 hour) used by the mobile application, a date format window 240 including a track bar 242 for selecting the date format used by the mobile application (e.g., dd/mm/yyyy, mm/dd/yyyy, or yyyy/mm/dd), and a user update button 244. Activation of the user update button 244 may cause the mobile application to display a user update screen (not shown) that enables the user to update their username and password.

In operation, the dispenser controller 12 may measure and store data on the flow of chemical products, diluent, and dispensed solutions; dosing events; costs; and alarms for each of the dispensing devices 14 controlled by the dispenser controller 12. This operational data may be transmitted to, stored in, and organized by the database 28. The database 28 may be used to generate reports on production (e.g., loads, racks, or weight), usage, costs, and alarms, and provide recommended actions based on observations of the operational data. The mobile application may provide a real-time dashboard showing dispenser performance, daily wash summaries, and push notifications via email or messaging.

Advantages provided by embodiments of the invention may include reduced service costs, simplified installation, savings by reducing the frequency with which components (e.g., squeeze tubes) are replaced, improved versatility, reduced food safety concerns, and improved reliability.

For example, embodiments of the invention may reduce costs by enabling service only when needed with real-time information on alerts, usage, cost, and productivity. Installation may be simplified by the mobile application, which may facilitate installation with minimal tools, enable plug and play components, such as pumps, alarms, and probes, and reduce or eliminate costly field wiring of power, trigger signals, and probes. Global versatility may be provided by use of a single dispenser controller 12 for all types of warewash machines and probe types, feature boards that expand the capabilities of dispenser controllers 12 and dispensing devices 14, and compatibility with existing squeeze tube designs. Expansion boards that enable out of product detection and rinse aid or detergent tank temperature measurement, as well as the detection of dirty water and de-lime alerts, may increase washing machine performance and reduce food safety concerns. Pumps using direct current motors optimized for accuracy and reliability and alternative pump technologies may offer improved reliability.

Data access may be provided using different tiers. For example, a basic tier of service for deployments lacking the network access point 20 may use the mobile device 18 to transmit operational data to the database 28. The mobile device 18 may store and transmit data to the network when convenient, e.g., using an available cellular or Wi-Fi connection. A more advanced service tier may include the access point 20 and communication unit 32. The communication unit 32 may comprise a daughter board that is connected to the central processing unit 30 that enables the central processing unit 30 to communicate with the database 28 through the access point 20 on demand. The access point 20 may provide a communication hub that transmits data collected from multiple dispensing devices 14 by one or more dispenser controllers 12 to the network in real-time via a cellular or other network connection. This constant connectivity may enable more proactive alarm maintenance to reduce service costs, may eliminate the requirement for a kitchen manager to have the mobile application or be connected, and may leverage a common infrastructure that will support other dispensers, including but not limited to dilution and on-premise laundry systems.

Embodiments of the invention may be used with any type of system that uses chemical products, such as laundry dispensers connected to top load washers, washer/extractor, or tunnel washers. The dispenser controller 12 may be configured to dispense one or more chemical products (e.g., between one and ten chemical products) and operate with one or more washing machines (e.g., between one and ten washing machines) each having a capacity a different weight capacity.

When used with industrial commercial machines, such as a tunnel washer, the dispensing device 14 may comprise a cabinet having a width and depth (e.g., about six feet wide and six feed deep), and may include one or more pumps (e.g., up to five pumps) of a suitable type (e.g., pneumatic diaphragm pumps) to provide a suitable chemical product dispense rate (e.g., 1.1 gallons/minute) to one or more delivery channels (e.g., up to five channels/machines). This type of dispenser may include a user interface (e.g., a seven-inch touchscreen) and a controller (e.g., a programmable logic controller) capable of storing a plurality of formulas (e.g., over 100 formulas), an air-assist module to ensure rapid, consistent delivery of chemical products, and integrated calibration drives to provide accurate and quick calibrations. Integrated flow meters may be used to provide accurate dosing and usage data. The dispensing device 14 may include full reporting capabilities via Ethernet and remote/wireless access that allows users to monitor results and modify settings from anywhere using an Internet connection. Diaphragm pumps may provide advantages over peristaltic pumps by eliminating maintenance associated with squeeze tubes and preventing issues with chemically resilient components.

In another embodiment that may be used with industrial commercial machines, the dispensing device 14 may comprise a cabinet having a width and depth (e.g., about three feet wide and three feet deep), and may include one or more pumps (e.g., up to five pumps) of a suitable type (e.g., single or dual-channel pneumatic diaphragm pumps) to provide a suitable chemical product dispense rate (e.g., 1.1 gallons/minute) to one or more delivery channels (e.g., up to five channels/machines). The dispensing device 14 may also include an adaptable distributor (e.g., that uses electric valves to direct the flow of chemical product/diluent/solution) to allow flexibility as dispensing requirements change over time.

In another embodiment, the dispensing device 14 may be used in a central dosing system for an on premises laundry, and may include a PCB-based control panel with a user interface (e.g., a two-line 16-digit display and 6 button keypad) and a store a plurality of formulas (e.g., up to 40 formulas). The dispensing device 14 may be further configured to dispense one or more products (e.g., four, six, or eight products) and use one or more pumps (e.g., a one liter per minute electromagnetic diaphragm pump or 1.75 liter per minute pneumatic pump, with alternative pumps as an option), a proof of flow capacity (e.g., using a digital rotameter on the chemical product feedline), a paddle wheel flow meter on water or product delivery lines, and an adaptable distributor. The adaptable distributor may allow flexibility to supply one or more washer extractors (e.g., between four and six washer extractors). The above described dispensing device 14 may include a capability to be addressed and configured locally via the mobile device 18, thereby avoiding the need for personal computer software, and may also include online reporting capabilities via Ethernet and cloud-based services (e.g., Skylink Technology of Bellevue, Nebraska; or Microsoft Azure, available from the Microsoft Corporation of Redmond, Washington) to allow users to view summary statistics from anywhere with an Internet connection.

Figure 8:
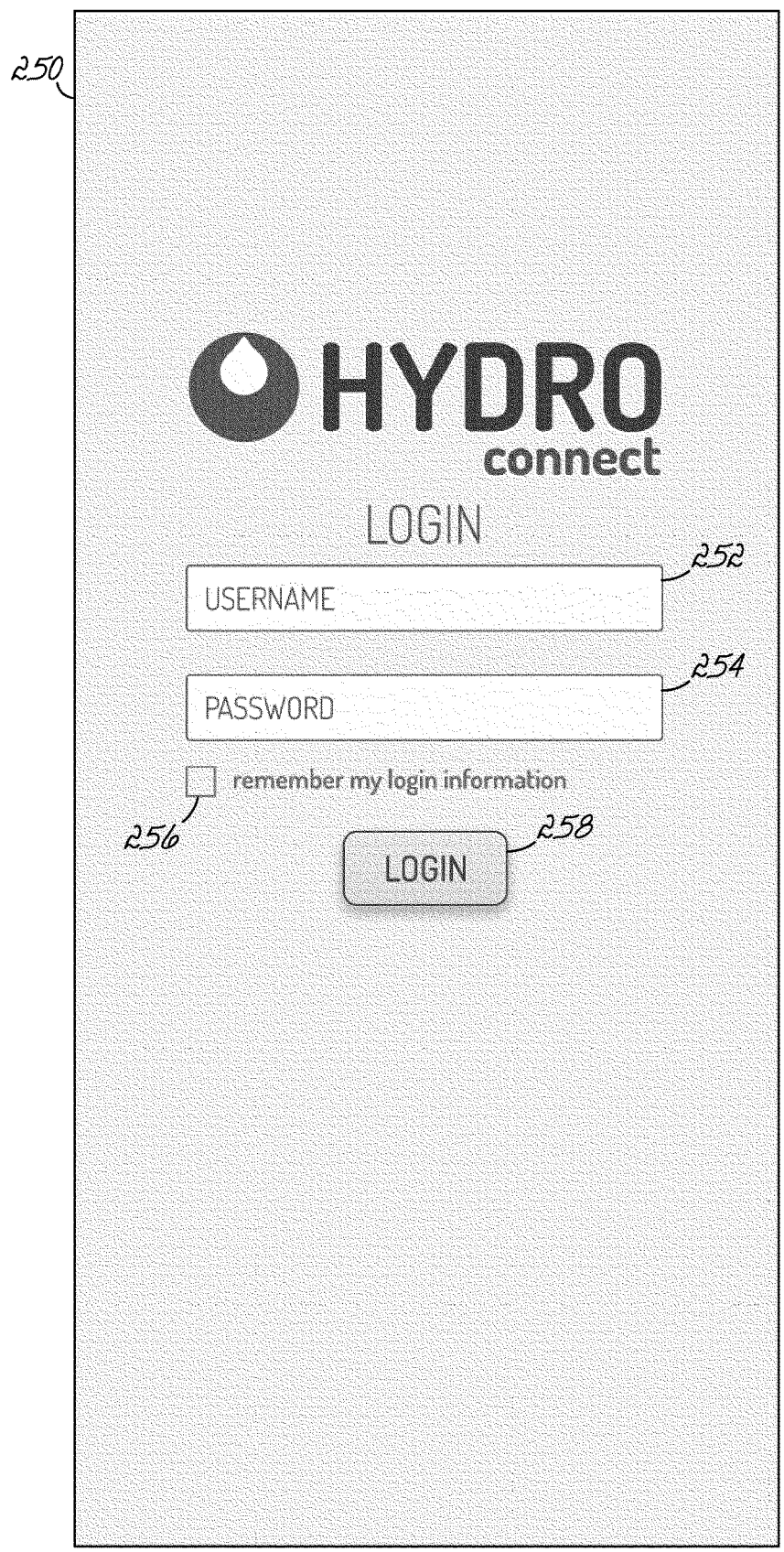

FIGS. 8-28 depict exemplary screens of a user interface that may be displayed by the mobile application in another embodiment of the invention. Referring now to FIG. 8, in response to the user activating a mobile application icon on the mobile device 18, the mobile application may cause the mobile device 18 to display a login screen 250 to the user. The login screen 250 may include a data entry fields 252, 254 for entering a username and a password, a check box 256 that provides an option of having the application remember the user when using the mobile device 18 in question to log back into the application, and a login button 258.

Figure 9:
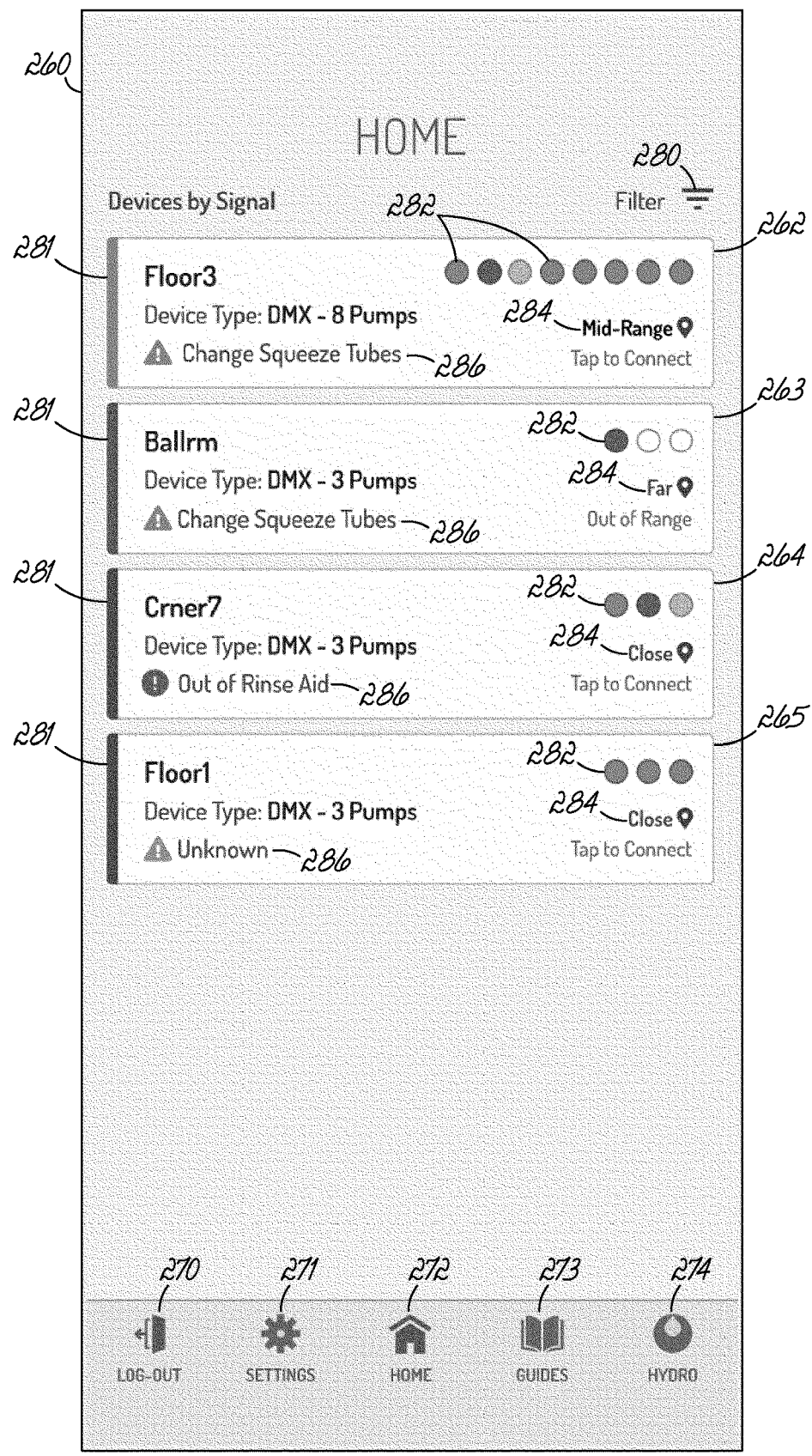

Referring now to FIG. 9, in response to the user entering their username and password, and activating the login button 258, the mobile application may cause the mobile device 18 display a home screen 260. The mobile application may also cause the mobile device 18 to scan for and wirelessly connect to dispenser controllers 12 within range. Scanning for dispenser controllers 12 may include transmitting interrogation signals (e.g., RFID or NFC interrogation signals) from the mobile device 18 and scanning for responses from dispenser controllers 12 prompted by the interrogation signals. Scanning for dispenser controllers 12 may also include scanning for signals autonomously transmitted by the dispenser controller 12 (e.g., Bluetooth or WiFi beacon signals). Once a connection to a dispenser controller 12 is established, the mobile application may cause the mobile device 18 to download data from the dispenser controller 12, such as the make, model, and serial number of the dispenser controller 12 and any dispensing devices 14 connected to the dispenser controller 12, as well as any configuration parameters currently loaded into the dispenser.

The home screen 260 may include one or more dispenser windows 262-265 each including information about a dispenser, one or more navigation buttons 270-274 for navigating to other screens, and a filter button 280. The information about the dispenser in the dispenser windows 262-265 may include a dispenser status bar 281 that changes color (e.g., from green to red) to indicate a status of the dispenser, component status indicators 282 (e.g., colored circles) each representing a component (e.g., a pump) associated with the dispenser, text describing the location and type of dispenser, a distance indicator 284 that provides an indication of how far the mobile device 18 is from the dispenser, and a status indicator 286 that provides an indication of the status of the dispenser (e.g., needs component to be replaced, out of a chemical). The distance between the mobile device 18 and each of the dispensers within range of the mobile device 18 may be determined, for example, based on a signal strength associated with a wireless data link between the mobile device 18 and dispenser controller 12.

The screen navigation buttons 270-274 may include a logout button 270, a settings button 271, a home button 272, a guides button 273, and a hydro connect button 274. Activating the filter button 280 may cause a dropdown window to be displayed that allows the user to filter the dispenser windows 262-265 displayed by signal strength or any other suitable criterion.

In response to the user activating (e.g., by touching) one of the displayed dispenser windows 262-265, the mobile application may cause the mobile device 18 to download data from the dispenser associated with the activated dispenser window 262-265. During the downloading process, the mobile application may cause the mobile device 18 to display instructions telling the user to remain close to the dispenser, and a status bar indicating progress of the download. The downloaded data may include dispenser configuration data, operational data, or any other suitable data.

Figure 10:
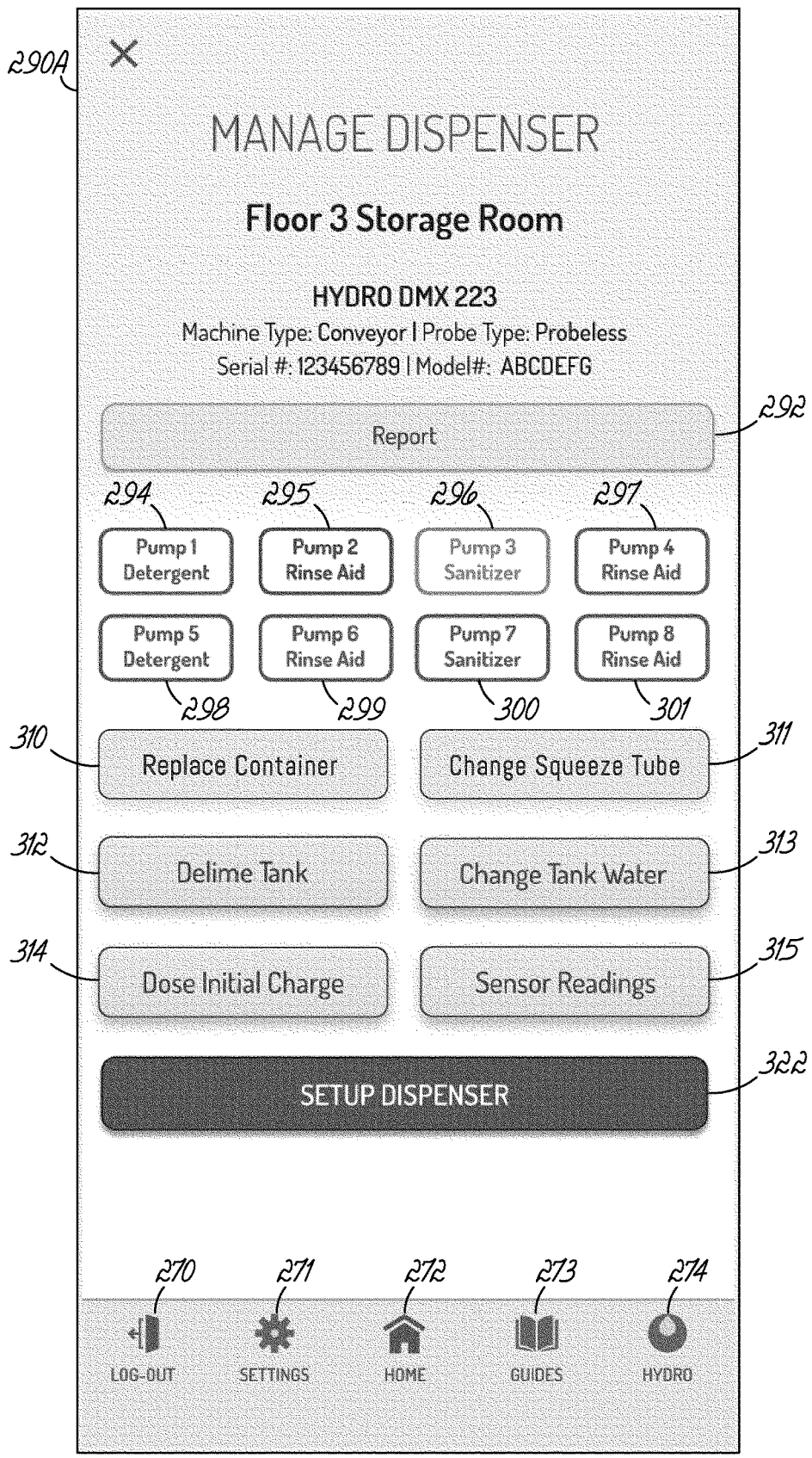

Referring now to FIG. 10, in response to the download completing, the mobile application may cause the mobile device 18 to display a manager screen 290A. The manager screen 290A may include a header displaying information about the dispenser (e.g., location, dispenser type, serial number, and model number), a report button 292, one or more pump buttons 294-301, one or more maintenance buttons 310-315 (e.g., a replace container button 310, change squeeze tube button 311, a delime tank button 312, a change tank water button 313, dose initial charge button 314, and sensor reading button 315), and a setup button 322. Depending on the type of dispenser or pump selected, or more of the maintenance buttons 310-315 may be grayed-out to indicate that the buttons are currently disabled. Maintenance buttons 310-315 may be disabled, for example, when they are associated with a feature that is not applicable to the dispenser or pump in question. In response to the user activating the sensor reading button 315, the mobile application may cause the mobile device 18 to display a screen showing real time sensor readings, e.g., live tank temperature, live rinse temperature, last rack rinse temperature, live concentration probe reading, etc.

Figure 13:

Activating the report button 292 of manager screen 290A may cause the mobile device 18 to display a chemical product report screen 330 such as depicted by FIG. 11. The chemical product report screen 330 may include report type check boxes 332-334 for selecting the type of data to be reported (e.g., chemical use check box 332, racks check box 333, events check box 334) and one or more report range check boxes 338, 340 (e.g., one week, one month) for selecting the period of time over which the selected report is to be run. Activating a report type check box 332-334 may cause the mobile device 18 to display data associated with the report in question. For example, the chemical use reports depicted on the chemical product report screen 330 may display the amount of each chemical product dispensed over the selected period (e.g., one week). Usage may be broken down by sub-periods (e.g., usage for each day and a total for the week, usage for each week and total for the month, etc.). As depicted by FIGS. 12 and 13, respectively, a rack report screen 350 may be displayed in response to the user selecting the racks check box 333, and includes the number of racks processed over the reporting period. An events report screen 360 may be displayed in response to the user activating the events check box 334, and includes the number of events that occurred over the reporting period.

Referring now to FIG. 14, activating a specific time period (e.g., Monday, August 5) on the events report screen 360 may cause the mobile device 18 to display a detailed events report screen 365. The detailed events report screen 365 may list each type of event and how many times that event was counted in the period. Exemplary events may include, but are not limited to detergent low, faulty probe detected, low tank temperature, delime tank reminder, change water tank, out of detergent, out of rinse aid, out of sanitizer, squeeze tube change, and pump jam.

Figure 15:
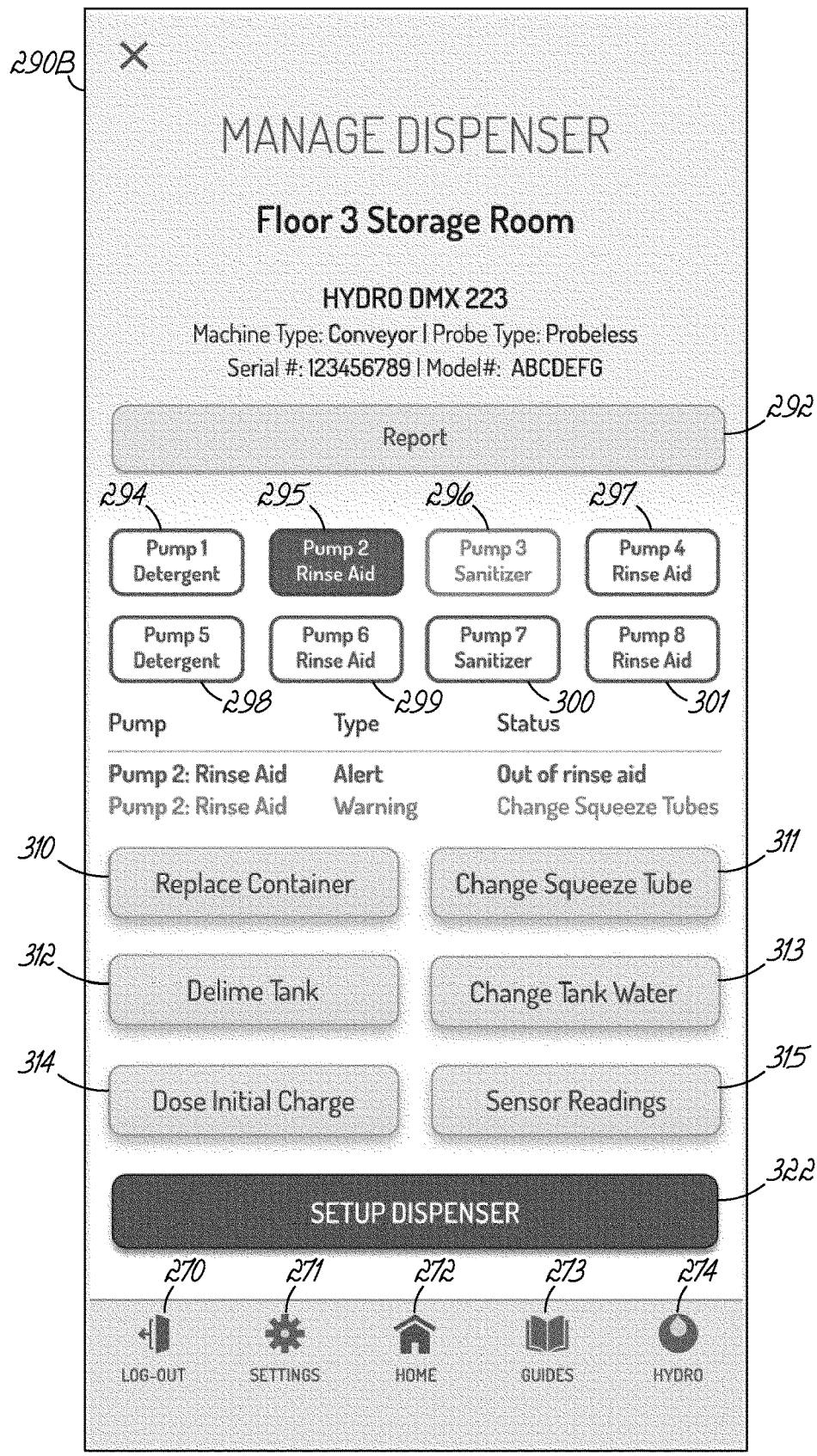

FIG. 15 depicts the manager screen 290B as it may appear in response to the user activating one of the pump buttons 294-301 (e.g., pump button 295). In response to activation of a pump button, the mobile application may cause one or more warnings associated with the pump in question to be displayed in the manager screen 290B. Activation of a pump button 294-301 may also cause the mobile application to enable one more additional maintenance buttons 310-315 corresponding to the pump, e.g., the replace container button 310 and change squeeze tube button 311.

In response to pressing a maintenance button 310-315 associated with a warning (e.g., the replace container button 310), the mobile application may cause the mobile device 18 to display a popup window with instructions on how to clear the event, a cancel button, and a complete button. Once the maintenance has been completed (e.g., the container has been replaced, the chemical has been refilled, the squeeze tube has been replaced, etc.), the user may activate the complete button on the popup window. This may cause the mobile application to return to the manager screen 290B and update the status of the pump to reflect clearing of the alert.

Figure 16:
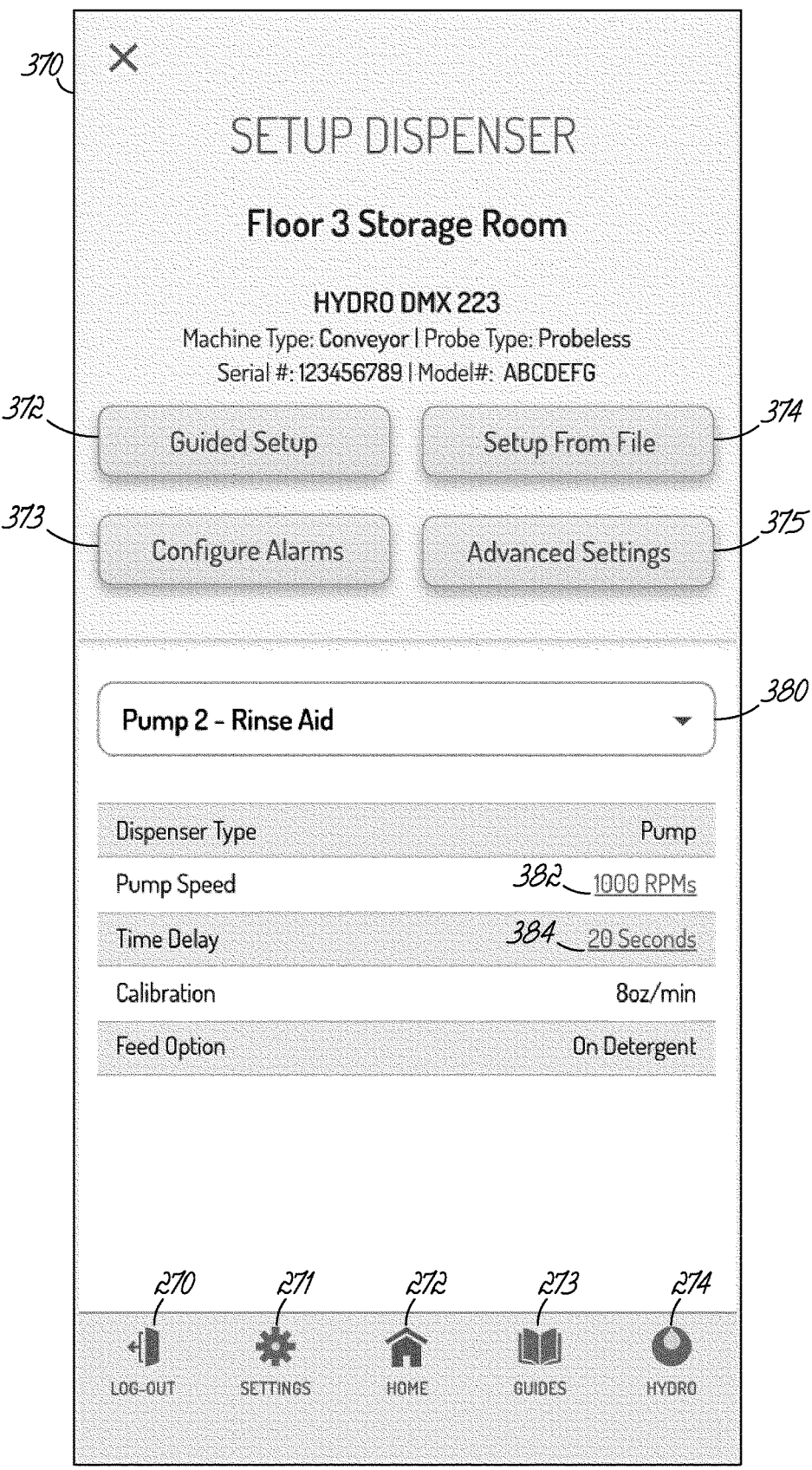

Referring now to FIG. 16, in response to the user activating the setup button 322 of manager screen 290B, the mobile application may cause the mobile device 18 to display a home dispenser setup screen 370. The home dispenser setup screen 370 may include one or more setup buttons 372-375, e.g., a guided setup button 372, a configure alarms button 373, a setup from file button 374, and an advanced setting button 375. The home dispenser setup screen 370 may also include a dropdown menu 380 for selecting a pump to configure, and one or more settings links 382, 384.

Figure 17:
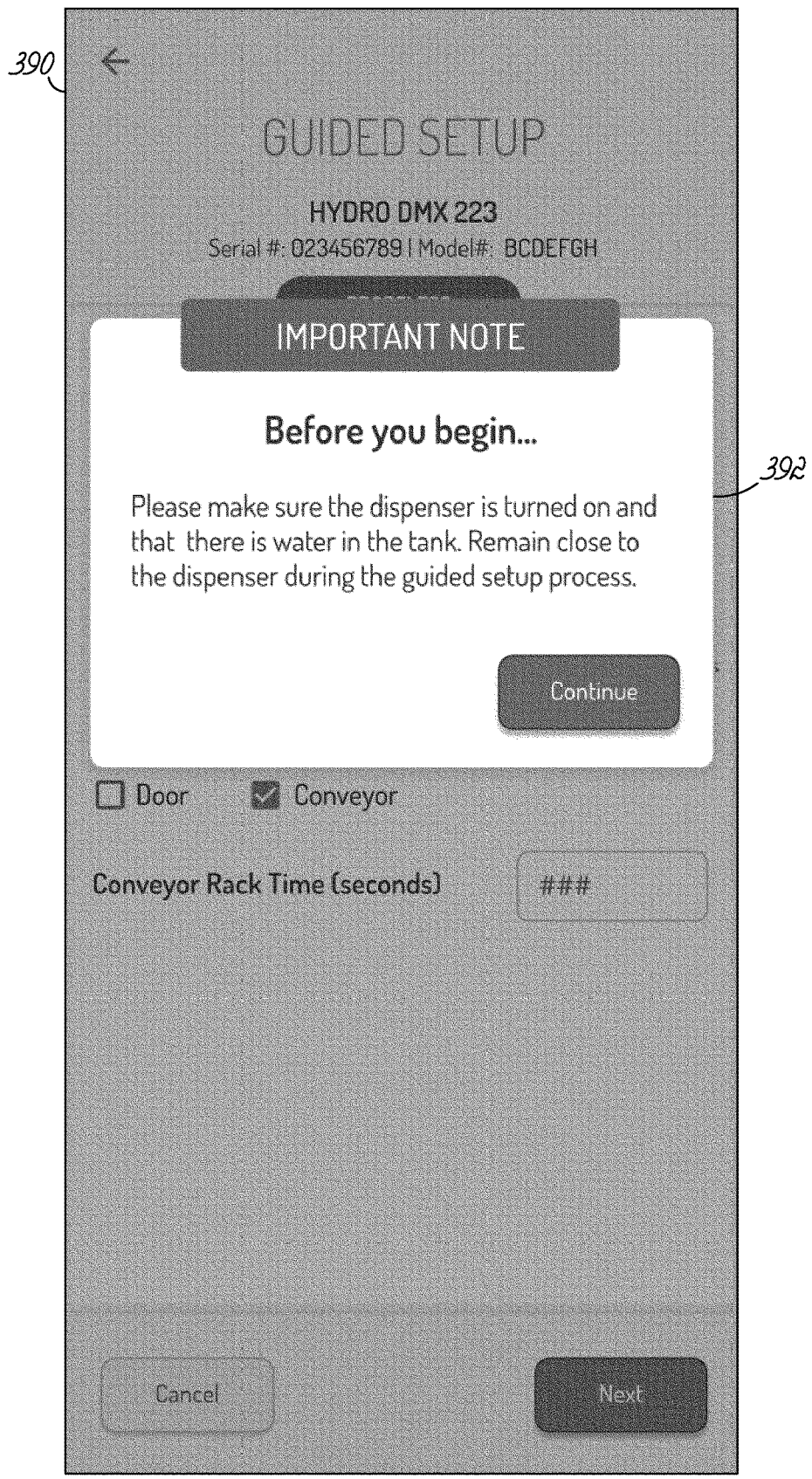
Figure 18:
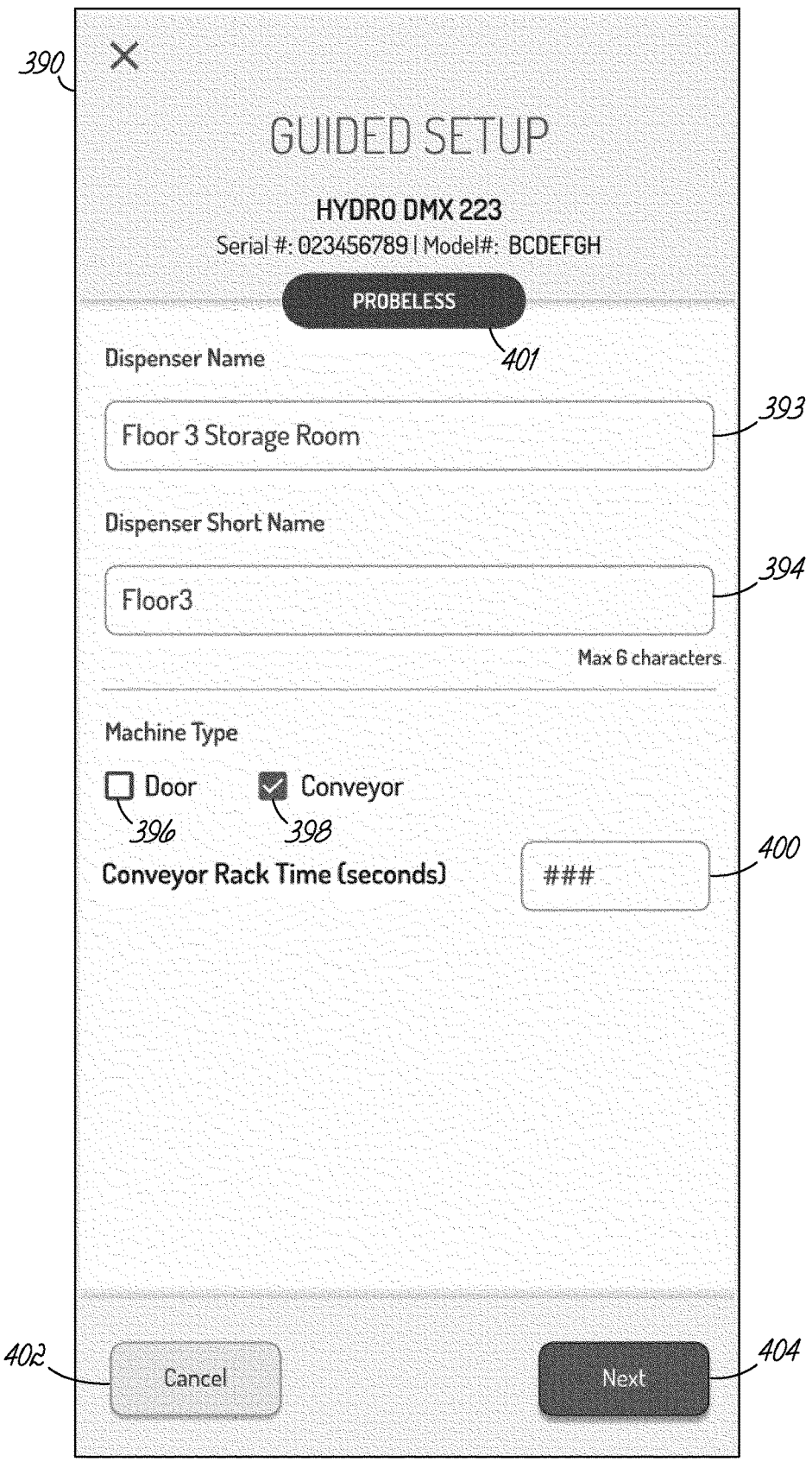

FIGS. 17-18 depict a home guided setup screen 390 that may be displayed by the mobile device 18 in response to activation of the guided setup button 372. The home guided setup screen 390 may initially be obscured by a popup window 392 including instructions or warnings associated with the type of setup being performed. The exemplary popup window 392 depicted by FIG. 17 instructs the user to make sure the dispenser is turned on, that there is water in the tank, and to remain close to the dispenser during the guided setup process. Before the mobile application allows the user to continue, the user may be required to activate a continue button on the popup window 392, thereby providing an indication that the instructions have been acknowledged.

The home guided setup screen 390 may include a data entry field 393 for entering a name of the dispenser, a data entry field 394 for entering a short name for the dispenser, one or more machine type check boxes 396, 398 for selecting a type of machine the dispenser is dispensing chemicals to (e.g., door or conveyor warewash), a data entry field 400 for entering data about the machine (e.g., conveyor rack time), and a probe status indicator 401. The home guided setup screen 390 may also include a cancel button 402 and a next button 404. Activating the cancel button 402 may return the mobile application to the home dispenser setup screen 370. The probe status indicator 401 may provide an indication of the type of probe (if any) used by the dispensing device 14 (e.g., conduction probe, float probe, or probeless). The presence and type of probes connected to the dispenser may be determined by one or more of the dispenser controller 12 and dispensing device 14, and transmitted to the application as described above. Activating the next button 404 may cause the mobile device 18 to display a pump configuration guided setup screen 410.

Figure 19:
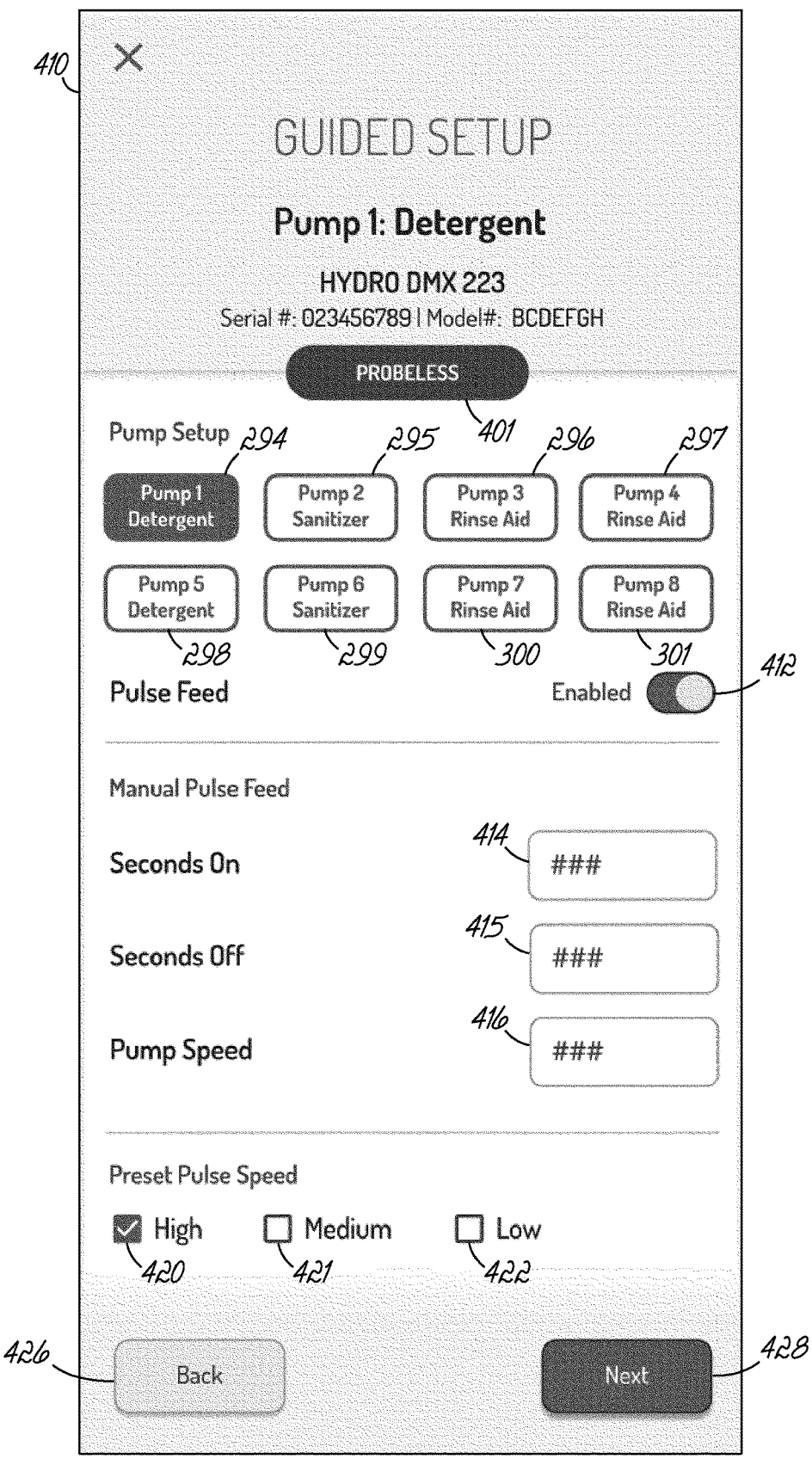

Referring now to FIG. 19, the pump configuration guided setup screen 410 may include the pump buttons 294-301, an information header that provides information on the selected pump (e.g., a detergent pump), a pulse feed enable slider button 412, one or more pump parameter data entry fields 414-416 for setting pump parameters for the selected pump, one or more preset pulse speed check boxes 420-422 for setting the pump pulse speed, a back button 426 that returns the user to the previous guided setup screen, a next button 428 that causes the mobile application to display the next guided setup screen, and a probe status indicator 429.

Figure 20:
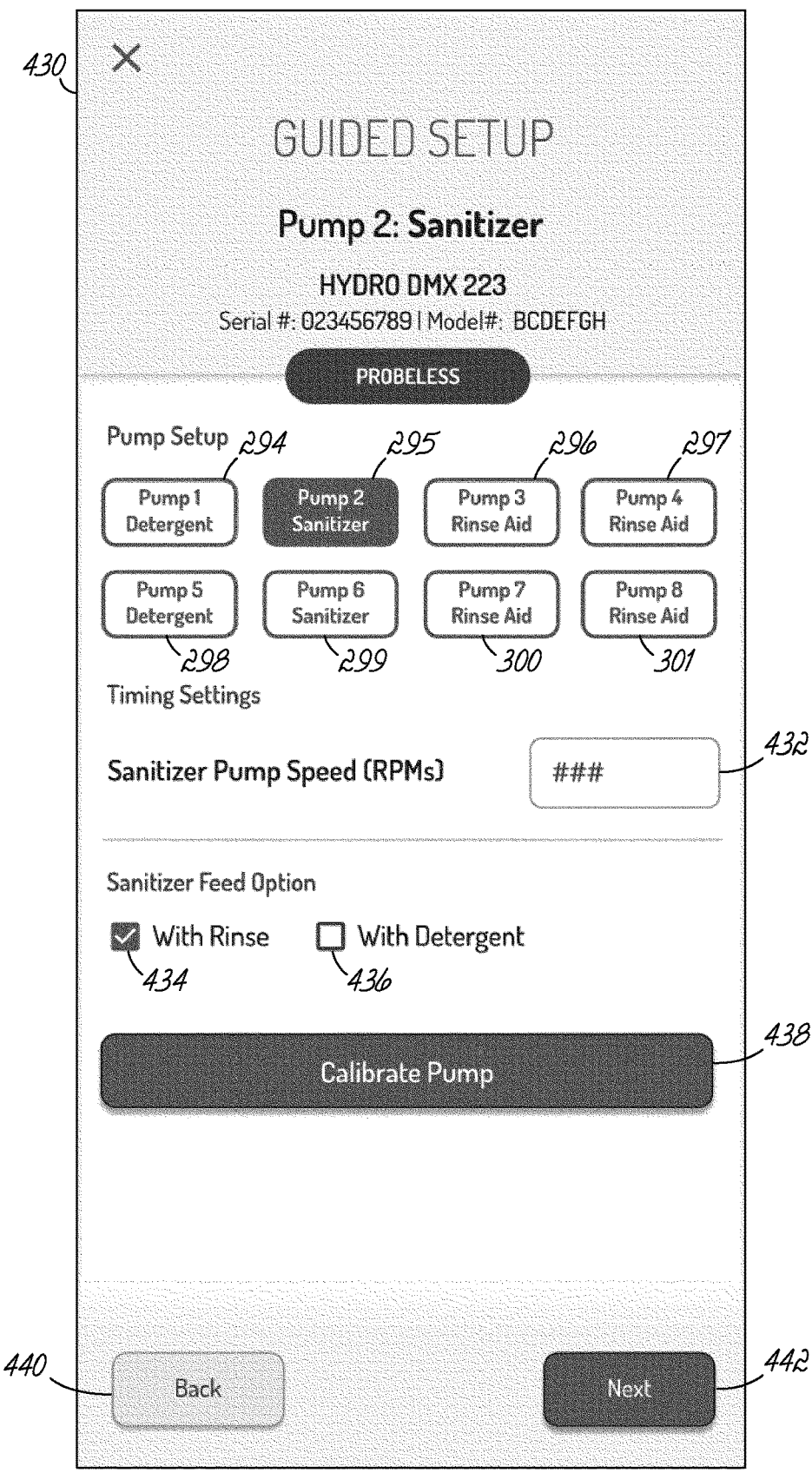

Activating a pump button 294-301 may cause the mobile device 18 to display a pump configuration screen for that pump. As depicted by FIG. 20, activating sanitizer pump button 295 may cause the mobile device 18 to display a pump configuration guided setup screen 430 for a sanitizer pump. The sanitizer pump configuration guided setup screen 430 may include a timing data entry field 432 for entering a pump speed, sanitizer feed option check boxes 434, 436 (e.g., with rinse or with detergent), a calibrate pump button 438, a back button 440, and a next button 442. It should be understood that each pump configuration setup screen may be configured according to the selected pump type, and embodiments of the invention are not limited to the exemplary pump configuration guided setup screens 410, 430 depicted herein.

Figure 21:
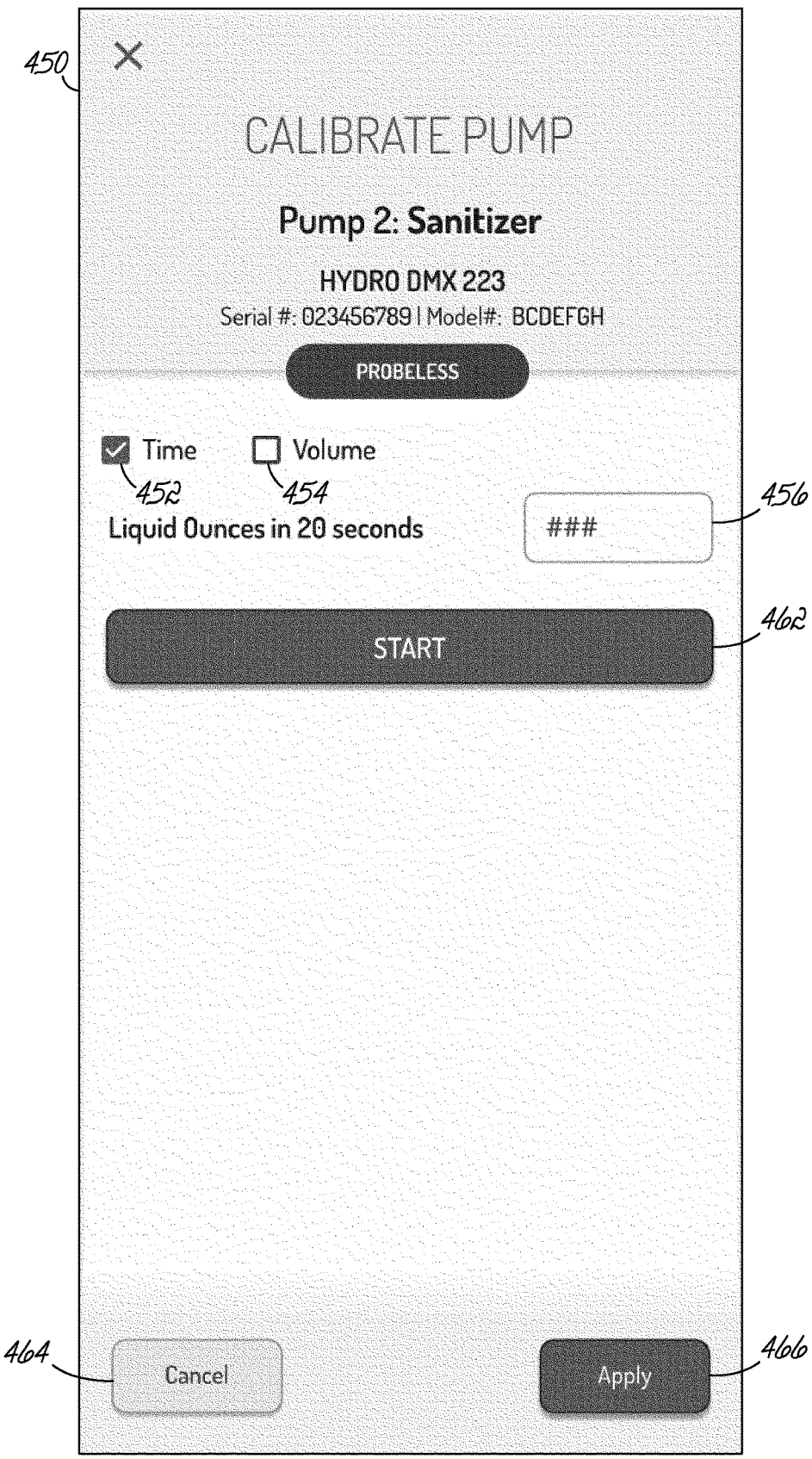
Figure 22:
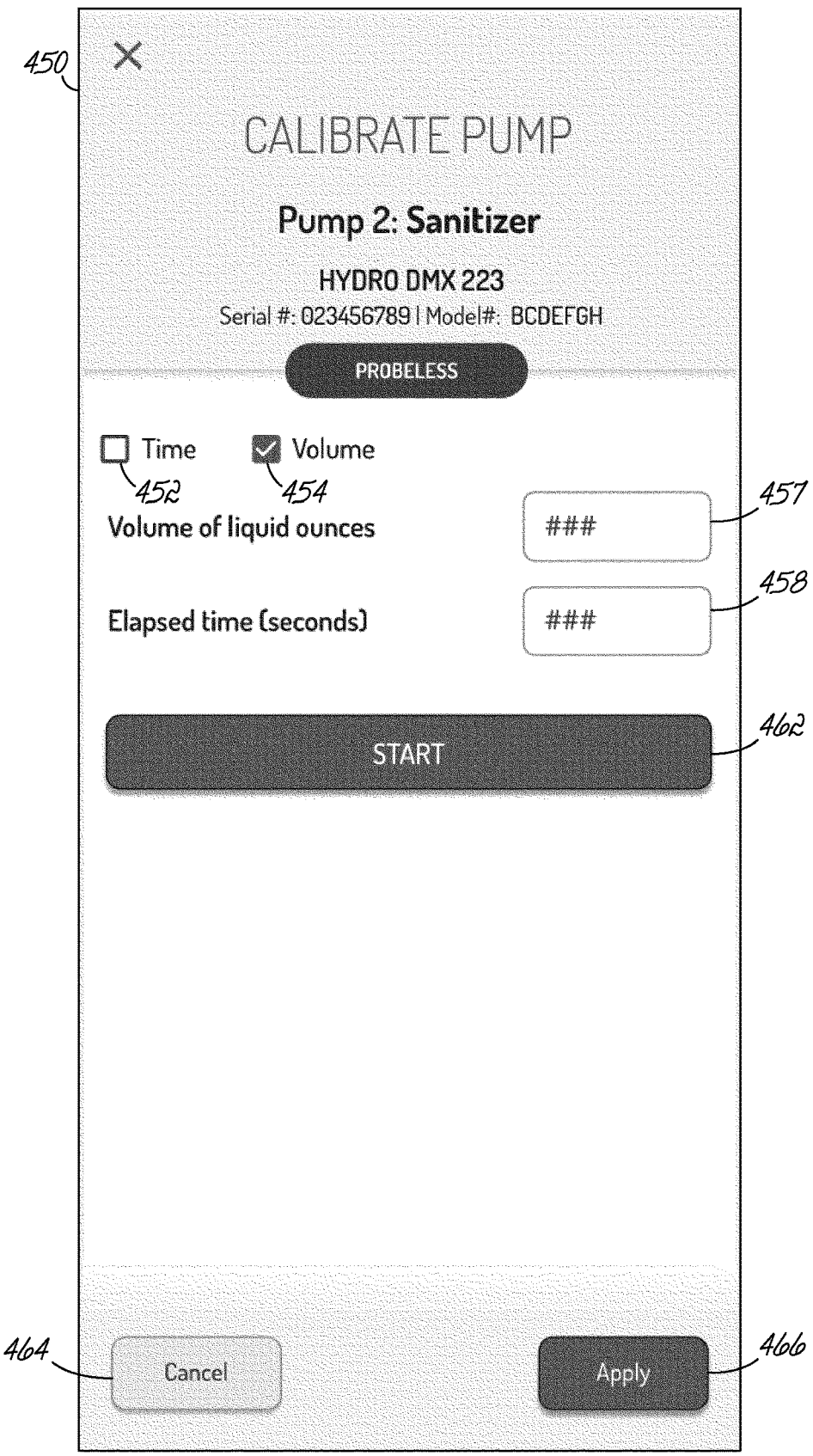

As depicted by FIGS. 21 and 22, activating the calibrate pump button 438 may cause the mobile application to display a calibrate pump screen 450. The calibrate pump screen 450 may include one or more check boxes 452, 454 to select the type of calibration to be performed (e.g., time or volume), one or more data entry fields 456-458 corresponding to the selected calibration (e.g., amount of liquid dispensed in the allotted time, or volume of liquid and elapsed time), a start button 462, a cancel button 464, and an apply button 468. Activating the time check box may cause the mobile device 18 to display a calibrate pump screen configured for performing a time-based pump calibration as depicted by the calibrate pump screen 450 of FIG. 21. In the exemplary calibrate pump screen 450 depicted by FIG. 22, the volume check box 454 is selected so that the screen is configured for performing a volume-based pump calibration.

In a time-based calibration, activating the start button 462 may cause the pump to operate for a predetermined amount of time (e.g., 20 seconds) while the output of the pump is collected in a measuring device, such as a graduated cylinder. The amount of chemical product pumped into the measuring device may then be entered into the date entry field 456 so that the dispenser controller 12 can determine a calibration factor for the pump.

In a volume based calibration, activating the start button 462 may cause the pump to be activated. The start button may then become a stop button which is activated to deactivate the pump when the predetermined volume has been dispensed into the measuring device. While the pump is activated, the mobile application may track the elapsed time in the data entry field 458, or this time may be kept by the user. In any case, once the pump has been stopped, the volume of chemical product dispensed into the measuring device and the elapsed time may be entered into their respective data entry fields 457, 458, and the values provided to the dispenser controller 12 for determining the calibration factor.

Figure 23:
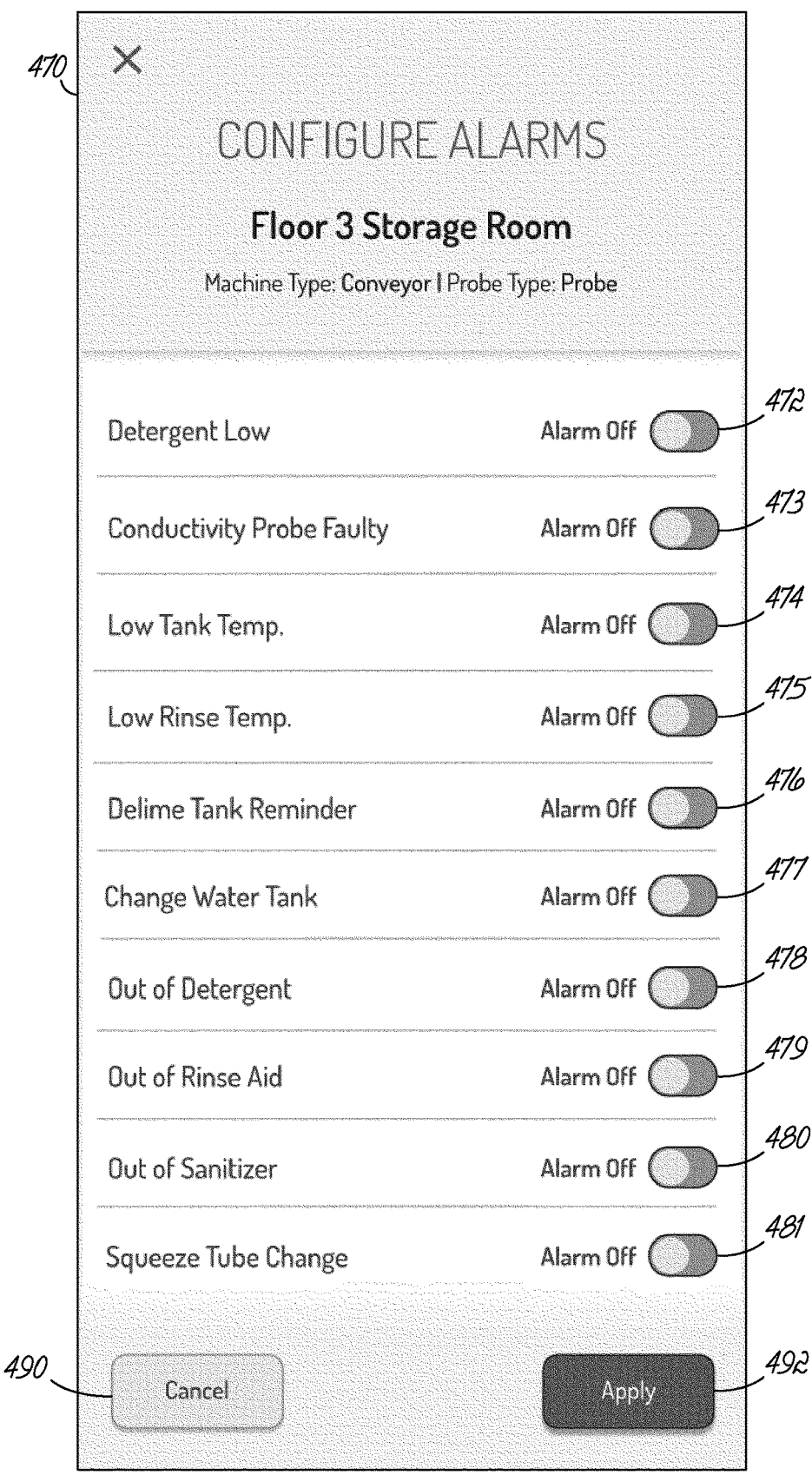

Activating the configure alarms button 373 of home dispenser setup screen 370 (FIG. 16) may cause the mobile device 18 to display a configure alarms screen 470 such as depicted by FIG. 23. The configure alarms screen 470 may include a list of one or more alarms each associated with a slider button 472-481, a cancel button 490, and an apply button 492.

Figure 24:
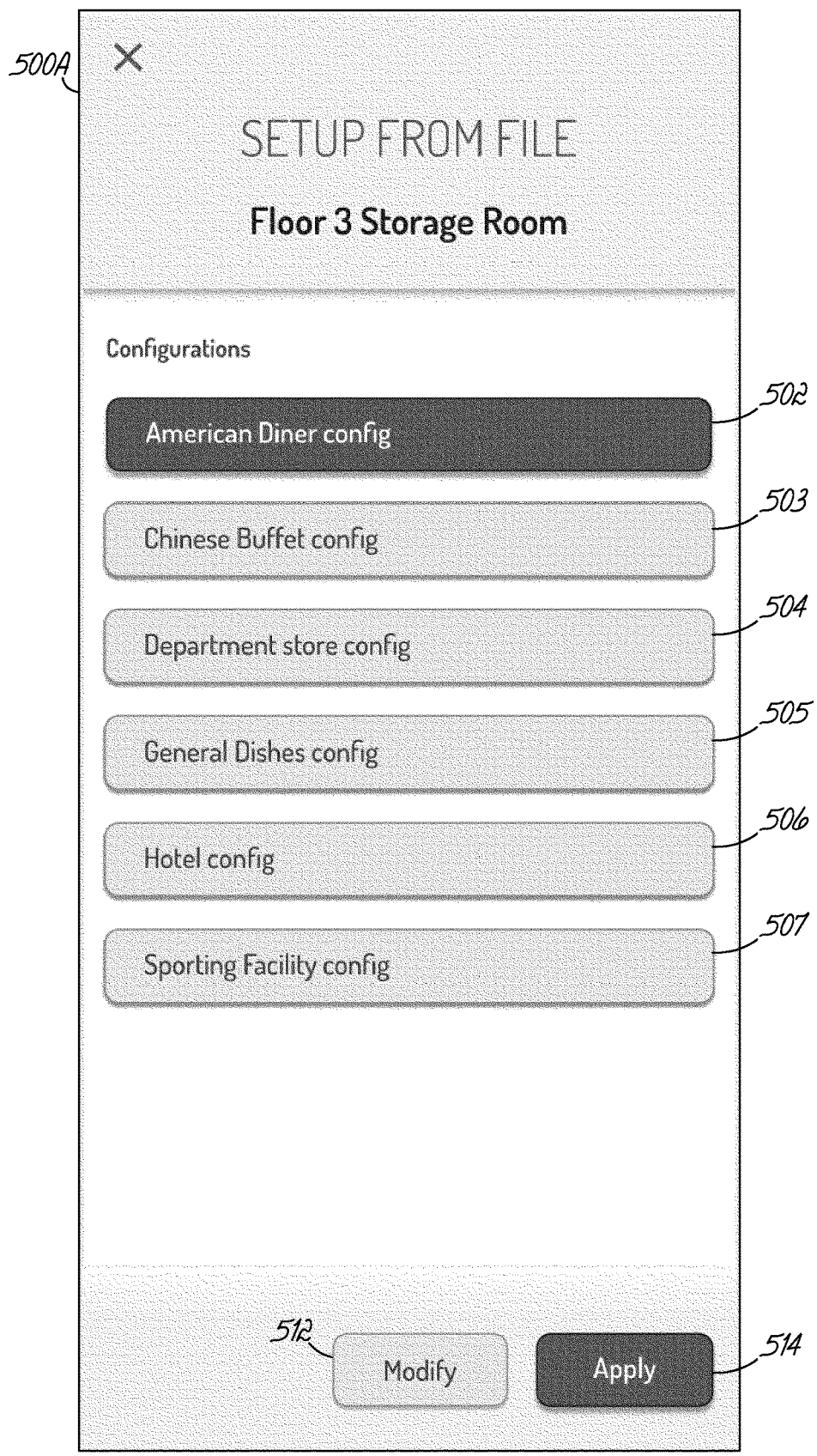

Referring now to FIG. 24, activating the setup from file button 374 of home dispenser setup screen 370 may cause the mobile device 18 to display a setup from file screen 500A. The setup from file screen 500A may include one or more configuration buttons 502-507, a modify button 512, and an apply button 514. Activating a configuration button 502-507 may enable the user to activate the modify button 512 or apply button 514 to modify the selected dispenser configuration or apply the selected dispenser configuration to the dispenser being configured, e.g., the "Floor 3 Storage Room" dispenser.

Multiple dispenser configurations may be created by a chemical product distributer or other entity and stored in a database, e.g., database 28. This database of configuration files may provide a library of predefined dispenser configurations for use in the field. The user may download a configuration file from the database into the mobile device 18 or other computer running the application by activating a configuration button 502-507. The configuration parameters in the configuration file may then be uploaded into a dispenser controller 12 by activating the apply button 514. The configuration parameters may be uploaded with the same values they had when received from the database, or after one or more parameters have been customized to optimize a particular dispenser installation.

The above library feature may allow the user to set up a dispenser in the field using a predefined dispenser configuration file. Advantageously, this feature would enable a chemical company, for example, to build a library of standard configurations. These standard configurations may simplify training and improve consistency of configuration parameters, e.g., the cost of chemical products and dispense amounts will always be correct. It also allows individual dispensers to be setup more quickly, saving time and money.

In the above scenario, a setup from file process may begin by the application downloading the corporate library of configuration files associated with the chemical company into a local memory of the mobile device 18. After the user has been authenticated (e.g., by logging into the application), the user can view configuration files associated with libraries to which they have been granted access, e.g., the library of a chemical company they represent. The application may allow the user to filter configuration files on one or more criteria. Filtering criteria may include, but is not limited to file name, machine type (e.g., door or conveyer), and probe setting (e.g., capacitive probe, inductive probe, probeless machine). Based on the model of dispenser being configured, the application may recognize whether a configuration is valid or invalid for that dispenser. Configuration files which would be invalid for the dispenser (e.g., wrong number of pumps or liquid verses solid chemical products) may be filtered out by the application so that only valid configuration files are displayed to the user when viewing configuration file libraries.

After the user has selected the configuration, the application may cause the mobile device 18 to display a summary of the configuration parameters and an apply button that, when activated, causes the selected configuration to be uploaded to the dispenser. In response to activating the apply button, the application may display a warning that indicates this action will overwrite the current settings in the dispenser, and may take a certain amount of time (e.g., 30 seconds) to complete. This warning may include another button that enables the user to confirm the apply action.

Some dispenser parameters may vary too much from unit to unit to be part of a standard library configuration file. For example, pump calibration values, the name of the site where the dispenser is located, the name of the dispenser, etc. These fields may be displayed to the user with instructions to enter values before the apply function can be executed.

The user may create a new configuration file, or edit an existing configuration file, name the configuration file, and store the configuration file, either locally on their mobile device 18, or (if permitted) on the database 28. In an embodiment of the invention, the administrator of the library may prohibit the user from sharing new or modified configuration files. In this case, the user may only be allowed to save custom configuration files in a personal library stored locally in the mobile device 18, or that is stored in an area of the database 28 which is not accessible by other users. In another embodiment of the invention, the application may enable the user to forward a configuration file to other users, e.g., as an attachment to an email or other message.

Figure 25:
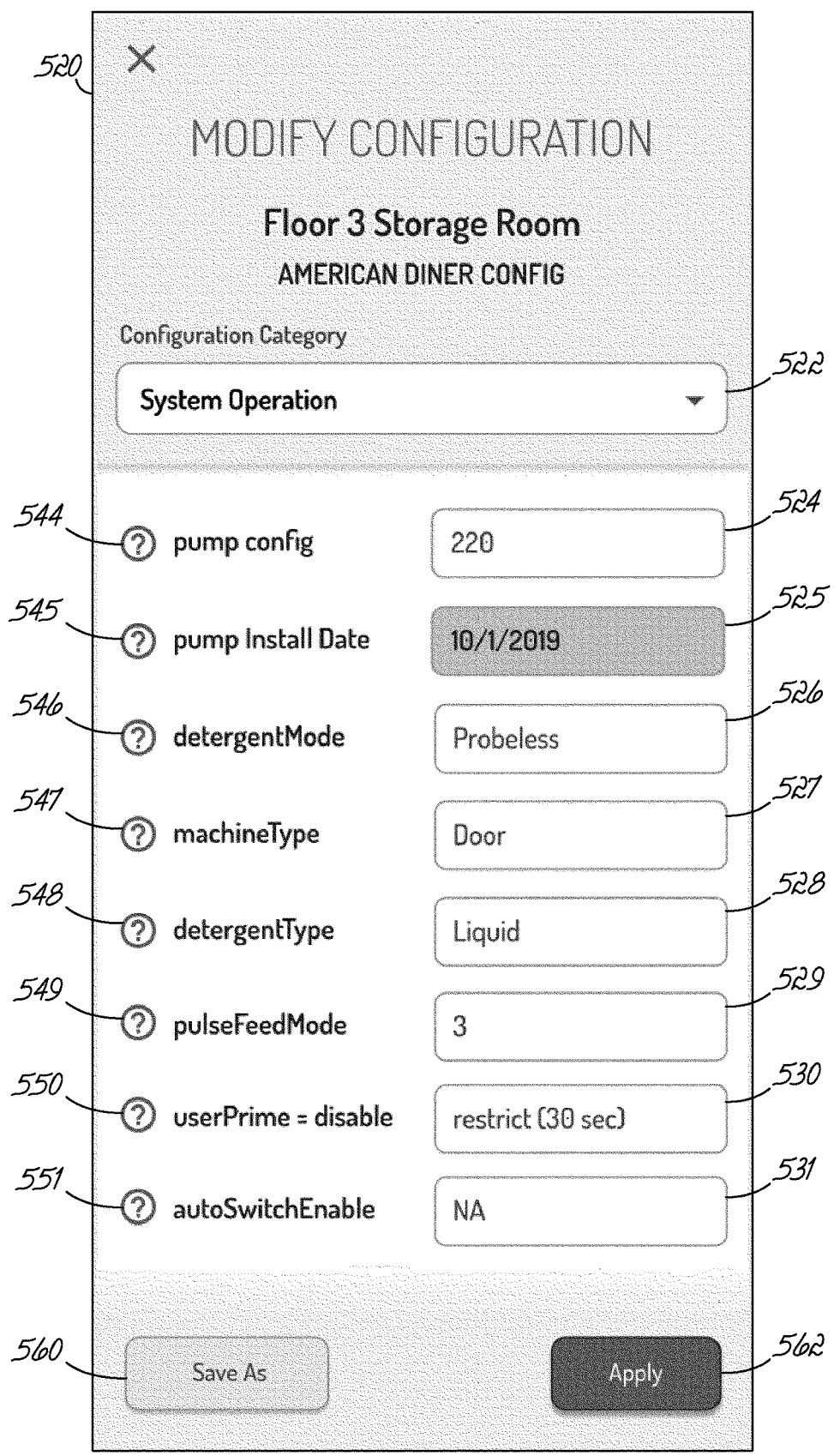

Referring now to FIG. 25, activating the modify button 512 may cause the mobile device 18 to download the configuration file from the network database or from local memory, and display a modify configuration screen 520 for the selected configuration, e.g., the "American Diner" configuration associated with configuration button 502. The modify configuration screen 520 may include a configuration category drop down menu 522 that allows the user to select a configuration category, and one or more configuration parameter data entry fields 524-531 each associated with a configuration parameter.

One or more of the data entry fields 524-531 may be pre-populated with parameter values defined by the configuration file. One or more of the parameter values may be fixed so that the user can only view the parameter value, or may be modifiable by the user entering a new value into the respective data entry field 524-531. The Exemplary configuration parameters may include pump configuration, pump install date, detergent mode, machine type, detergent type, pulse feed mode, user prime enable/disable, auto switch enable, etc. Each of the configuration parameters may also be associated with an information button 544-551. The modify configuration screen 520 may also include a save as button 560 and an apply button 562. Modified configuration files may be stored locally, or uploaded to the network database for future use.

Activating an information button 544-551 may cause the mobile device 18 to display a popup window including information on the parameter in question. For example, activating the "pulseFeedMode" parameter information button 549 may cause the mobile device 18 to display a popup window informing the user that entering 0-7 selects the pulse feed on/off time, with 0=always off (i.e., a 0% duty cycle), and 7 being always on (i.e., a 100% duty cycle). Each configuration parameter may initially be set to a pre-determined value corresponding to the selected configuration.

Advantageously, storing configuration files in a database may enable a distributer of chemical products, an owner of a chain of restaurants, or other responsible entity to have chemical dispensers configured with a standard set of configuration parameters suited to the chemical products dispensed or a particular dispensing application. The configuration file database may also facilitate updating chemical dispenser configurations, which could be pushed out to dispensers directly or through the mobile device 18 of a visiting technician. For example, in response to a health department modifying the requirements for the amount of sanitizer to be dispensed when cleaning dishes, an operator could update this parameter in each dispenser within the geographic region governed by the health department. By way of another example, a chemical product distributer that changes the formula of a chemical product could update the dispensers dispensing the chemical product in question by simply updating the configuration file on the database and updating the dispenser as the new chemical product is delivered.

Figure 26:
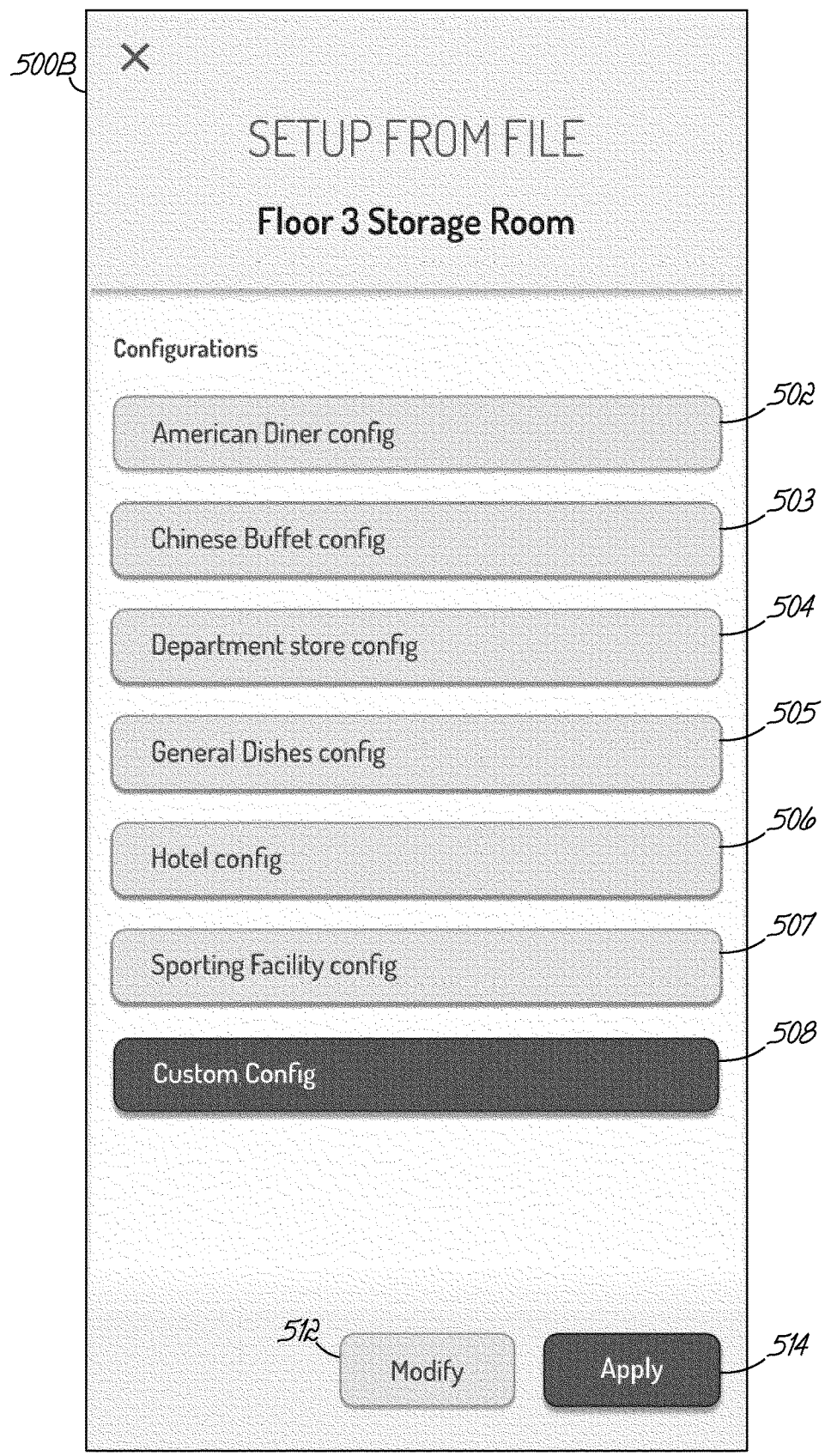

The user may be allowed to modify a configuration file by changing certain parameters. The parameters may be changed, for example, by entering data into a corresponding data entry field 524-531. In response to the user activating the apply button, the mobile application may cause any modified parameter values to be updated for the configuration file in question. Activating the save as button 560 may cause the mobile device 18 to display a popup window including a configuration name data entry field, a cancel button, and a save button. The user may thereby save a custom configuration file to facilitate loading the parameters defined by the configuration file into multiple dispensers. FIG. 26 depicts an exemplary setup from file screen 500B that may be displayed in response to the user saving a new dispenser configuration. As can be seen, the setup from file screen 500B has an additional configuration button 508 as compared to the setup from file screen 500A before the modified configuration file was saved.

Figure 27:
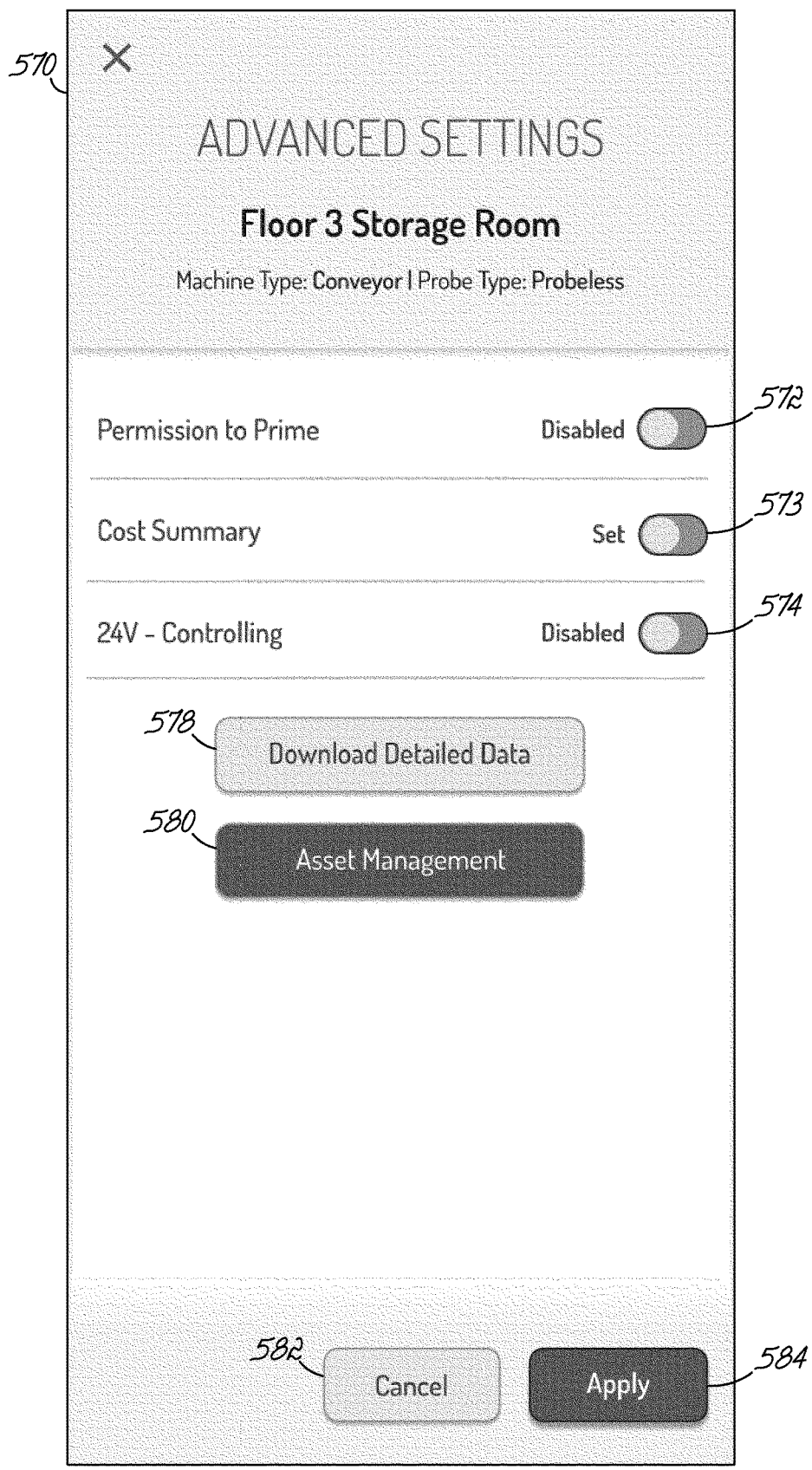

Referring now to FIG. 27, in response to the user activating the advanced setting button 375 of home dispenser setup screen 370, the mobile application may cause the mobile device 18 to display an advanced settings screen 570. The advanced settings screen may include one or more slider buttons 572-574 for selectively enabling/disabling features, a download detailed data button 578, an asset management button 580, a cancel button 582, and an apply button 584.

Activating a slider button 572-574 may cause the mobile device 18 to display a dropdown menu with one or more data entry fields. These data entry fields may allow the user to set various parameters for the feature the slider button enables. For example, how often and for how long the dispenser operator is allowed to prime a pump when a permission to prime feature is enabled, price per unit for chemical products being dispensed for use when a cost summary feature is enabled, etc.

Activating the download detailed data button 578 may cause the mobile device 18 to display a download data screen that allows the user to selectively download data from the dispenser. For example, the user may be able to download diagnostic data or rack data, and may be able to specify a time period during which the data to be downloaded was generated, e.g., one month, three months, all available data.

Figure 28:
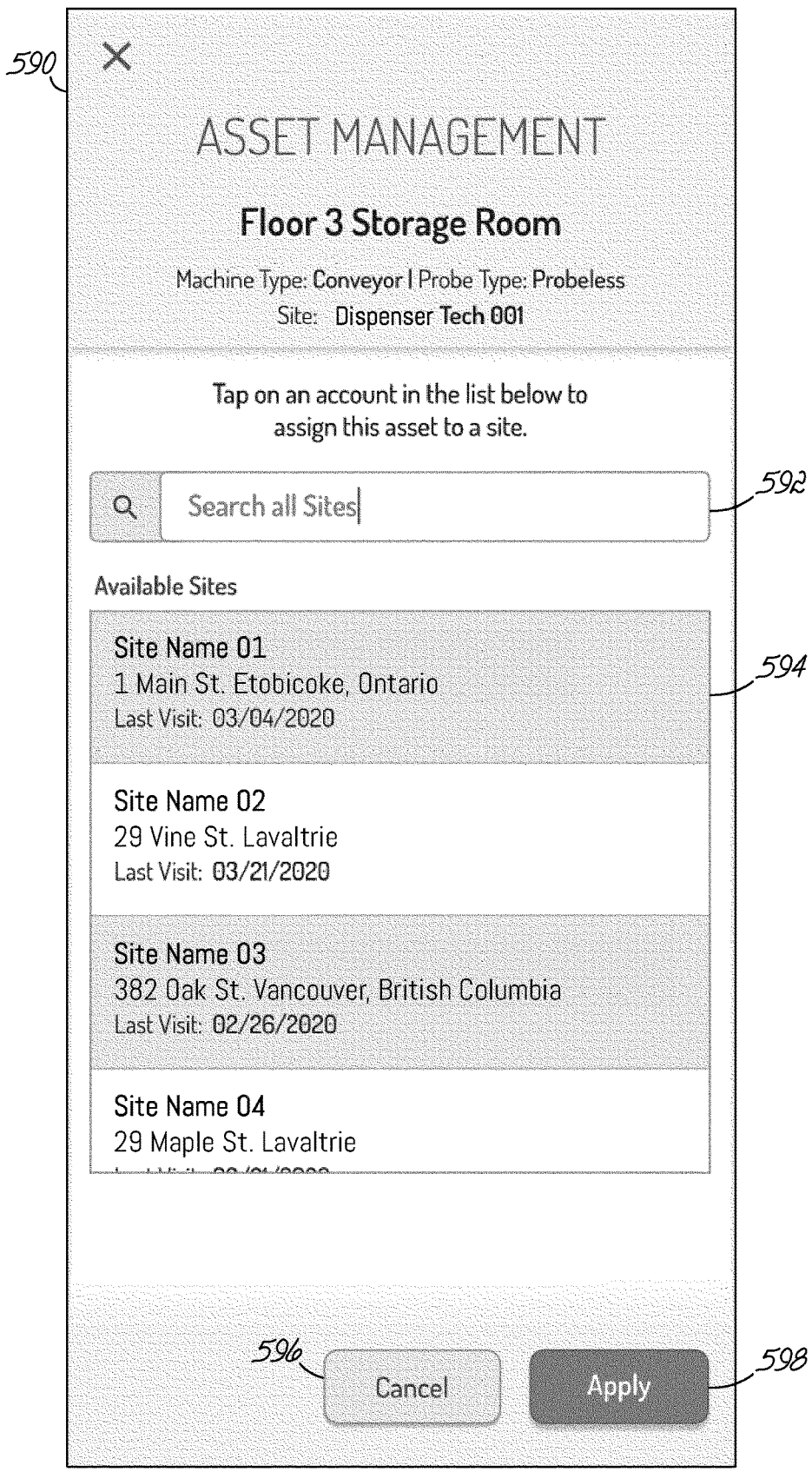

Referring now to FIG. 28, activating the asset management button 580 may cause the mobile device 18 to display an asset management screen 590. The asset management screen 590 may include a search data entry field 592 that allows the user to enter search terms, an available sites window 594 that displays a list of available sites, a cancel button 596, and an apply button 598. Available sites and their addresses may be determined, for example, by querying the database 28 for geographic locations where the user's employer maintains dispensers. Selecting an available site from the list of available sites and activating the apply button may cause the mobile device 18 to transmit data to the database 28 associating the selected dispenser (e.g., the "Floor 3 Storage Room" dispenser) with the selected site. The asset management feature may thereby facilitate tracking assets, as well as checking the status of any dispenser within range of the mobile device 18 or known to the database 28.

The asset management feature may associate the serial number of each dispenser to a location where the dispenser was last communicated with by a mobile device 18. In this way, the asset management feature may facilitate tracking of dispensers. The location of a dispenser within range of the mobile device 18 may be determined at least in part based on a distance between the mobile device 18 and the dispenser, and the geographic location of the mobile device 18 at the time this distance is determined. As described above, one way this distance may be determined is based on the signal strength of the wireless data link between the mobile device 18 and dispenser controller 12. In cases where the mobile device 18 uses the Bluetooth wireless protocol to communicate with the dispenser controller 12, this distance may be short enough to provide a relatively accurate location for the dispenser controller 12. The geographic location of the mobile device 18 may then be used to identify potential sites in the database 28 with which the dispenser may be associated.

Figure 29:
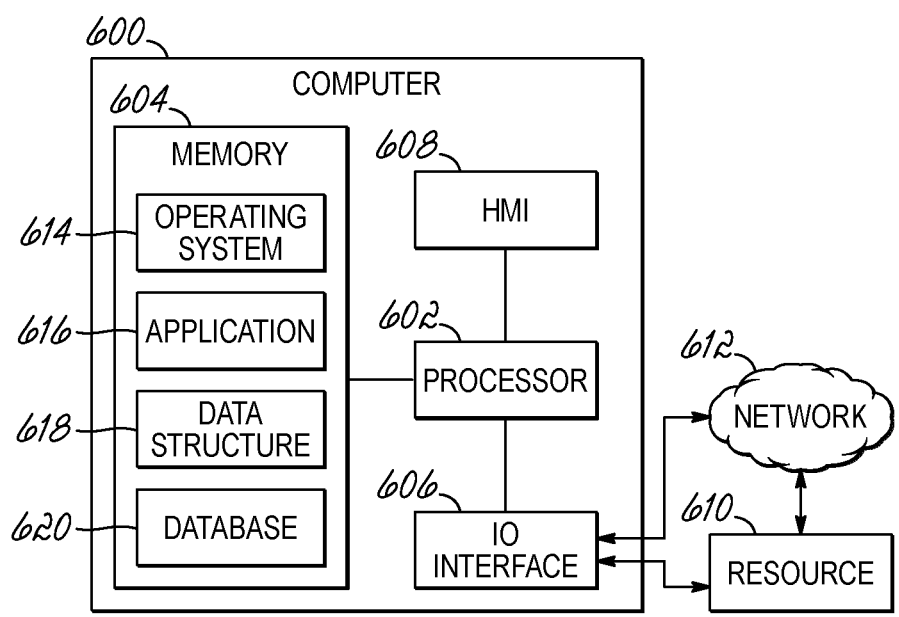
FIG. 29 is a diagrammatic view of a computer that may be used to implement one or more of the components or processes shown in FIGS. 1-28.

Referring now to FIG. 29, embodiments of the invention described above, or portions thereof (e.g., the dispenser controller 12, dispensing device 14, washing machine 16, mobile device 18, network access point 20, network 22, computers 24-27, or database 28) may be implemented using one or more computer devices or systems, such as exemplary computer 600. The computer 600 may include a processor 602, a memory 604, an input/output (I/O) interface 606, and a Human Machine Interface (HMI) 608. The computer 600 may also be operatively coupled to one or more external resources 610 via the network 612 or I/O interface 606. External resources may include, but are not limited to, servers, databases, mass storage devices, peripheral devices, cloud-based network services, or any other resource that may be used by the computer 600.

The processor 602 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 604. Memory 604 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 602 may operate under the control of an operating system 614 that resides in memory 604. The operating system 614 may manage computer resources so that computer program code embodied as one or more computer software applications, such as an application 616 residing in memory 604, may have instructions executed by the processor 602. In an alternative embodiment, the processor 602 may execute the application 616 directly, in which case the operating system 614 may be omitted. One or more data structures 618 may also reside in memory 604, and may be used by the processor 602, operating system 614, or application 616 to store or manipulate data.

The I/O interface 606 may provide a machine interface that operatively couples the processor 602 to other devices and systems, such as the external resource 610 or the network 612. The application 616 may thereby work cooperatively with the external resource 610 or network 612 by communicating via the I/O interface 606 to provide the various features, functions, applications, processes, or modules comprising embodiments of the invention. The application 616 may also have program code that is executed by one or more external resources 610, or otherwise rely on functions or signals provided by other system or network components external to the computer 600. Indeed, given the nearly endless hardware and software configurations possible, persons having ordinary skill in the art will understand that embodiments of the invention may include applications that are located externally to the computer 600, distributed among multiple computers or other external resources 610, or provided by computing resources (hardware and software) that are provided as a service over the network 612, such as a cloud computing service.

The HMI 608 may be operatively coupled to the processor 602 of computer 600 to allow a user to interact directly with the computer 600. The HMI 608 may include video or alphanumeric displays, a touch screen, a speaker, and any other suitable audio and visual indicators capable of providing data to the user. The HMI 608 may also include input devices and controls such as an alphanumeric keyboard, a pointing device, keypads, pushbuttons, control knobs, microphones, etc., capable of accepting commands or input from the user and transmitting the entered input to the processor 602.

A database 620 may reside in memory 604, and may be used to collect and organize data used by the various systems and modules described herein. The database 620 may include data and supporting data structures that store and organize the data. In particular, the database 620 may be arranged with any database organization or structure including, but not limited to, a relational database, a hierarchical database, a network database, or combinations thereof. A database management system in the form of a computer software application executing as instructions on the processor 602 may be used to access the information or data stored in records of the database 620 in response to a query, which may be dynamically determined and executed by the operating system 614, other applications 616, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flow-charts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the flow-charts, sequence diagrams, or block diagrams.

In certain alternative embodiments, the functions, acts, or operations specified in the flow-charts, sequence diagrams, or block diagrams may be re-ordered, processed serially, or processed concurrently consistent with embodiments of the invention. Moreover, any of the flow-charts, sequence diagrams, or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system for configuring a dispenser, comprising:
  a database containing one or more configuration files each defining one or more parameter values that configure the dispenser; and
  a mobile device in communication with the database and configured to:
    scan for dispensers within range of the mobile device,
    wirelessly connect to one or more of the dispensers within range of the mobile device,
    display one or more dispenser windows each associated with one of the dispensers within range of the mobile device, each dispenser window including a status indicator that indicates a status of the dispenser associated with the dispenser window,
    download a configuration file from the database, and
    upload the one or more parameter values defined by the configuration file to a controller of at least one of the one or more dispensers,
  wherein the one or more parameter values cause the at least one dispenser to operate in accordance with the configuration file, and
  wherein the one or more dispensers are fluidly coupled to both a container of chemical product and a separate source of diluent.

2. The system according to claim 1, wherein the mobile device is further configured to:
  in response to connecting to the one or more dispensers, download data from the one or more dispensers.

3. The system according to claim 1, wherein the mobile device is further configured to:

determine a location of at least one of the dispensers within range of the mobile device; and
upload the location to the database.

4. The system according to claim 1, wherein the data downloaded from the dispenser includes configuration data, and the mobile device is further configured to:
in response to activation of one of the one or more dispenser windows, display a manager screen that includes the configuration data for the dispenser associated with the activated dispenser window.

5. The system according to claim 4, wherein the manager screen includes one or more pump buttons, the data downloaded from the dispenser includes pump status data, and the mobile device is further configured to:
in response to activation of a pump button, display a status of the pump.

6. The system according to claim 1, wherein each status indicator indicates if the respective dispenser is in an alarm condition.

7. The system according to claim 1, wherein the mobile device is further configured to:
determine if each of the dispensers within range of the mobile device meets a filter criterion; and
only display dispenser windows for dispensers that meet the filter criterion.

8. The system according to claim 1, wherein the mobile device is further configured to:
display a setup from file button; and
in response to activation of the setup from file button, display one or more configuration buttons each associated with a respective configuration file in the database,
wherein the configuration file is downloaded in response to activation of a configuration button associated with the configuration file.

9. The system according to claim 8, wherein the mobile device is further configured to:
in response to activation of the configuration button associated with the configuration file, display a configuration screen that includes one or more configuration parameter data entry fields each associated with a configuration parameter.

10. The system according to claim 9, wherein at least one of the one or more configuration parameter data entry fields is prepopulated with a parameter value defined by the configuration file.

11. The system according to claim 1, wherein the mobile device is further configured to:
display a guided setup button that initiates a setup process; and
in response to activation of the guided setup button, display a sequence of windows that prompt a user to enter configuration parameters.

12. The system according to claim 1, wherein the dispenser detects if a probe is connected to the dispenser, and if so, a type of the probe connected to the dispenser, and the mobile device is configured to display a probe status indicator that provides an indication of whether the probe is connected to the dispenser, and if so, the type of probe.

13. A method for configuring a dispenser, comprising:
scanning for dispensers within range of a mobile device;
wirelessly connecting the mobile device to one or more of the dispensers within range of the mobile device;
displaying, on the mobile device, one or more dispenser windows each associated with one of the dispensers within range of the mobile device;
downloading a configuration file to the mobile device from a database containing one or more configuration files each defining one or more parameter values that configure the dispenser; and
uploading the one or more parameter values defined by the configuration file from the mobile device to a dispenser controller of at least one of the one or more dispensers,
wherein the one or more parameter values cause the at least one dispenser to operate in accordance with the configuration file, and
wherein the one or more dispensers are fluidly coupled to both a container of chemical product and a separate source of diluent.

14. The method according to claim 13, further comprising:
in response to the mobile device connecting to the one or more dispensers, downloading data from the one or more dispensers into the mobile device.

15. The method according to claim 13, further comprising:
determining a location of at least one of the dispensers within range of the mobile device; and
uploading the location from the mobile device to the database.

16. The method according to claim 13, wherein the data downloaded from the dispenser includes configuration data, and further comprising:
in response to activation of one of the one or more dispenser windows, displaying, on the mobile device, a manager screen that includes the configuration data for the dispenser associated with the activated dispenser window.

17. The method according to claim 16, wherein the manager screen includes one or more pump buttons, the data downloaded from the dispenser includes pump status data, and further comprising:
in response to activation of a pump button, displaying a status of the pump on the mobile device.

18. The method according to claim 13, wherein each dispenser window includes a status indicator that indicates a status of the dispenser associated with the dispenser window and each status indicator indicates if the respective dispenser is in an alarm condition.

19. The method according to claim 13, further comprising:
determining if each of the dispensers within range of the mobile device meets a filter criterion; and
only displaying dispenser windows for the dispensers that meet the filter criterion.

20. The method according to claim 13, further comprising:
displaying a setup from file button on the mobile device; and
in response to activation of the setup from file button, displaying one or more configuration buttons each associated with a respective configuration file in the database on the mobile device,
wherein the configuration file is downloaded in response to activation of a configuration button associated with the configuration file.

21. The method according to claim 20, further comprising:
in response to activation of the configuration button associated with the configuration file, displaying a configuration screen that includes one or more configuration parameter data entry fields each associated with a configuration parameter.

22. The method according to claim 21, wherein at least one of the one or more configuration parameter data entry fields is prepopulated with a parameter value defined by the configuration file.

23. The method according to claim 13, further comprising:
    displaying, on the mobile device, a guided setup button that initiates a setup process; and
    in response to activation of the guided setup button, displaying a sequence of windows that prompt a user to enter configuration parameters into the mobile device.

24. The method according to claim 13, further comprising:
    detecting if a probe is connected to the dispenser, and if so, a type of the probe connected to the dispenser, and
    displaying a probe status indicator that provides an indication of whether the probe is connected to the dispenser, and if so, the type of probe.

25. A computer program product for configuring a dispenser, comprising:
    a non-transitory computer-readable storage medium; and
    program code stored on the non-transitory computer-readable storage medium that, when executed by one or more processors, causes the one or more processors to:
    scan for dispensers within range of a mobile device;
    wirelessly connect to one or more of the dispensers within range of the mobile device;
    display one or more dispenser windows each associated with one of the dispensers within range of the mobile device, each dispenser window including a status indicator that indicates a status of the dispenser associated with the dispenser window;
    download a configuration file to the mobile device from a database containing one or more configuration files each defining one or more parameter values; and
    upload the one or more parameter values defined by the configuration file from the mobile device to a controller of at least one of the one or more dispensers,
    wherein the one or more parameter values cause the at least one dispenser to operate in accordance with the configuration file, and
    wherein the one or more dispensers are fluidly coupled to both a container of chemical product and a separate source of diluent.

* * * * *